(12) United States Patent
Gonzalez et al.

(10) Patent No.: US 7,344,072 B2
(45) Date of Patent: Mar. 18, 2008

(54) CREDIT CARD SIZED USB FLASH DRIVE

(75) Inventors: Carlos J. Gonzalez, Los Gatos, CA (US); Edwin J. Cuellar, San Jose, CA (US); Robert C. Miller, San Jose, CA (US); Ronald LaPedis, San Bruno, CA (US)

(73) Assignee: SanDisk Corporation, Milpitas, CA (US)

(*) Notice: Subject to any disclaimer, the term of this patent is extended or adjusted under 35 U.S.C. 154(b) by 0 days.

(21) Appl. No.: 11/536,886

(22) Filed: Sep. 29, 2006

(65) Prior Publication Data

US 2007/0252010 A1 Nov. 1, 2007

Related U.S. Application Data

(60) Provisional application No. 60/745,813, filed on Apr. 27, 2006.

(51) Int. Cl.
*G06K 7/06* (2006.01)
(52) U.S. Cl. .................. 235/441; 235/380; 235/492
(58) Field of Classification Search ............... 235/492, 235/380, 441, 451
See application file for complete search history.

(56) References Cited

U.S. PATENT DOCUMENTS

| | | | | |
|---|---|---|---|---|
| 5,818,030 | A * | 10/1998 | Reyes | 235/492 |
| 6,116,927 | A | 9/2000 | Johnson et al. | 439/131 |
| 6,375,479 | B1 | 4/2002 | Johnson et al. | 439/131 |
| 6,381,143 | B1 | 4/2002 | Nakamura | 361/737 |
| 6,385,677 | B1 | 5/2002 | Yao | 710/102 |
| 6,427,837 | B1 | 8/2002 | Shields | 206/449 |
| 6,439,900 | B1 | 8/2002 | Sward | 439/131 |
| 6,561,421 | B1 | 5/2003 | Yu | 235/451 |
| 6,567,273 | B1 | 5/2003 | Liu et al. | 361/737 |
| 6,676,419 | B1 | 1/2004 | Lin et al. | 439/76.1 |
| 6,676,420 | B1 | 1/2004 | Liu et al. | 361/737 |
| 6,763,410 | B2 | 7/2004 | Yu | 710/74 |
| 6,792,487 | B2 | 9/2004 | Kao | 710/74 |
| 6,824,066 | B2 | 11/2004 | Weyant | 235/493 |

(Continued)

FOREIGN PATENT DOCUMENTS

DE 203 04 040 U1 7/2003

(Continued)

OTHER PUBLICATIONS

Compaq et al., "Universal Serial Bus Specification," Revision 2.0, Apr. 27, 2000, pp. 94-101.

(Continued)

*Primary Examiner*—Michael G. Lee
*Assistant Examiner*—Tuyen Kim Vo
(74) *Attorney, Agent, or Firm*—Winston & Strawn LLP

(57) ABSTRACT

A flash memory mass storage drive stores user files in a convenient credit card sized drive. Embodiments function as both a credit card and a mass storage drive. Communication may be through a host interface connector such as a USB connector, a magnetic interface, a smart card interface, and/or a near field communication interface. In certain embodiments the drive comprises a portion that is sufficiently thin to be swiped through a standard credit card, ATM, or point of sale device. The USB connector of the drive can easily be plugged into even a crowded receptacle of a host computing device.

18 Claims, 21 Drawing Sheets

U.S. PATENT DOCUMENTS

| | | |
|---|---|---|
| 6,854,984 B1 | 2/2005 | Lee et al. ............... 439/79 |
| 6,883,718 B1 | 4/2005 | Le et al. ............... 235/492 |
| 6,890,188 B1 | 5/2005 | Le ............... 439/76.1 |
| 6,908,038 B1 | 6/2005 | Le ............... 235/492 |
| 6,993,618 B2 | 1/2006 | Chen et al. ............... 710/305 |
| 7,004,794 B2 | 2/2006 | Wang et al. ............... 439/660 |
| 7,009,847 B1 | 3/2006 | Wu et al. ............... 361/737 |
| 7,025,275 B2 * | 4/2006 | Huang et al. ............... 235/486 |
| 2003/0095386 A1 | 5/2003 | Le et al. ............... 361/737 |
| 2003/0100203 A1 | 5/2003 | Yen ............... 439/79 |
| 2004/0033727 A1 | 2/2004 | Kao ............... 439/660 |
| 2004/0087194 A1 | 5/2004 | Wang et al. ............... 439/159 |
| 2005/0230483 A1 | 10/2005 | Miller et al. ............... 235/492 |
| 2005/0230484 A1 | 10/2005 | Cuellar et al. ............... 235/492 |
| 2006/0084287 A1 | 4/2006 | Miller et al. ............... 439/64 |
| 2006/0208066 A1 * | 9/2006 | Finn et al. ............... 235/380 |
| 2006/0273154 A1 * | 12/2006 | Dan ............... 235/380 |
| 2006/0278723 A1 * | 12/2006 | Dan et al. ............... 235/492 |
| 2007/0145135 A1 | 6/2007 | Jogand-Coulomb et al. ..... 235/451 |

FOREIGN PATENT DOCUMENTS

| | | |
|---|---|---|
| EP | 1429283 A2 | 6/2004 |
| EP | 1429283 A3 | 6/2004 |
| WO | WO 2005/086086 A1 | 9/2005 |

OTHER PUBLICATIONS

"The Card is Just Not a Card," Gizmodo, The gadget Blog, http://gizmodo.com/ downloaded Apr. 26, 2006, 1 page.

* cited by examiner

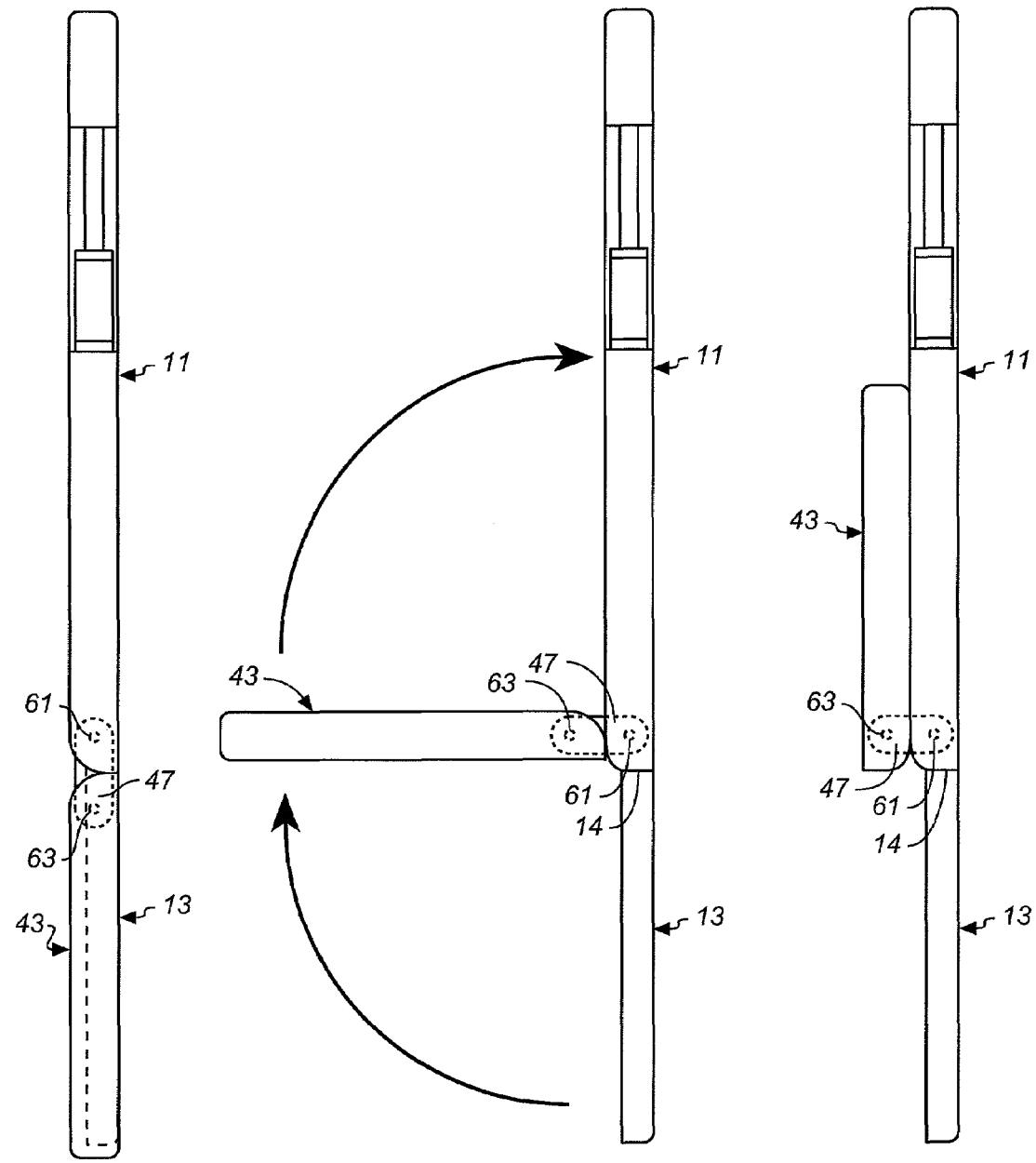
FIG. 3A  FIG. 3B  FIG. 3C

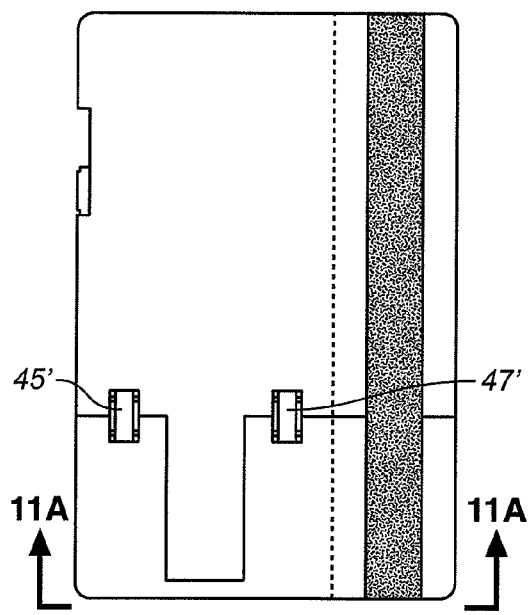
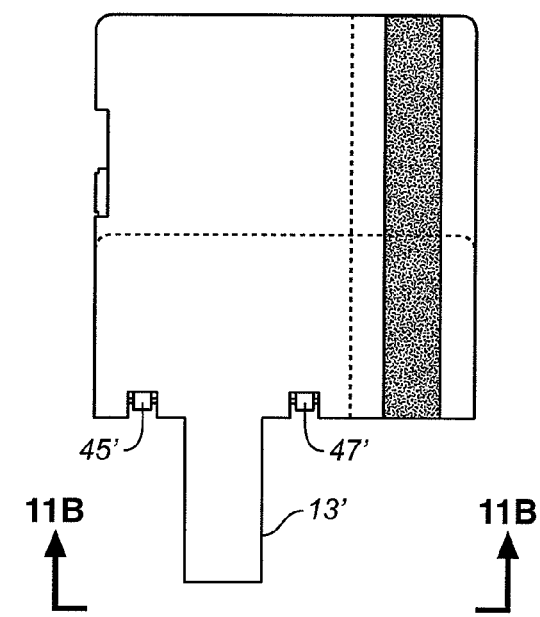
*FIG. 10A*  *FIG. 10B*
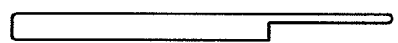
*FIG. 11A*  *FIG. 11B*
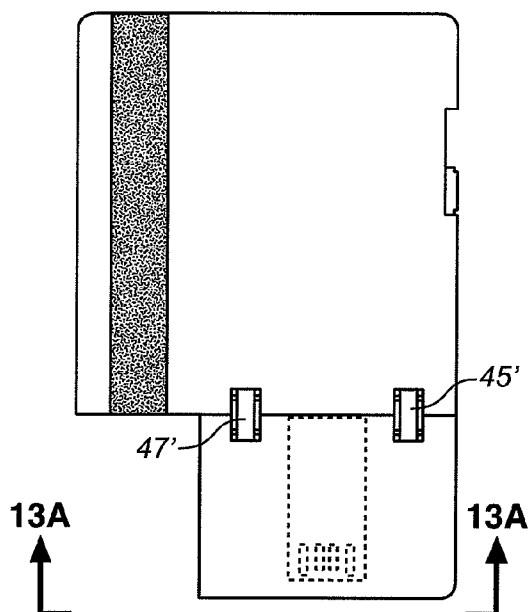
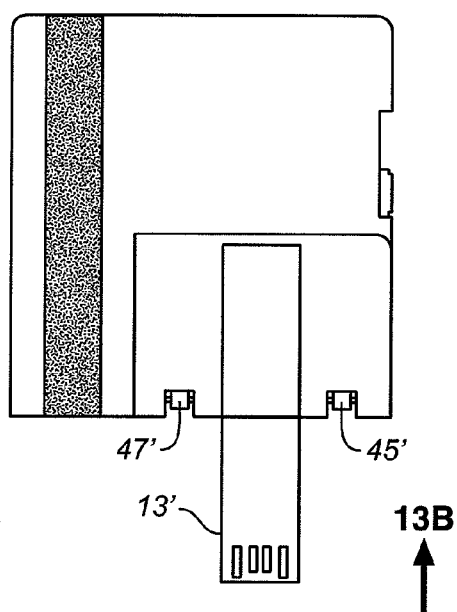
*FIG. 12A*  *FIG. 12B*
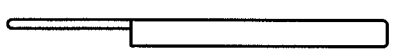
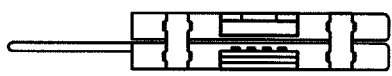
*FIG. 13A*  *FIG. 13B*

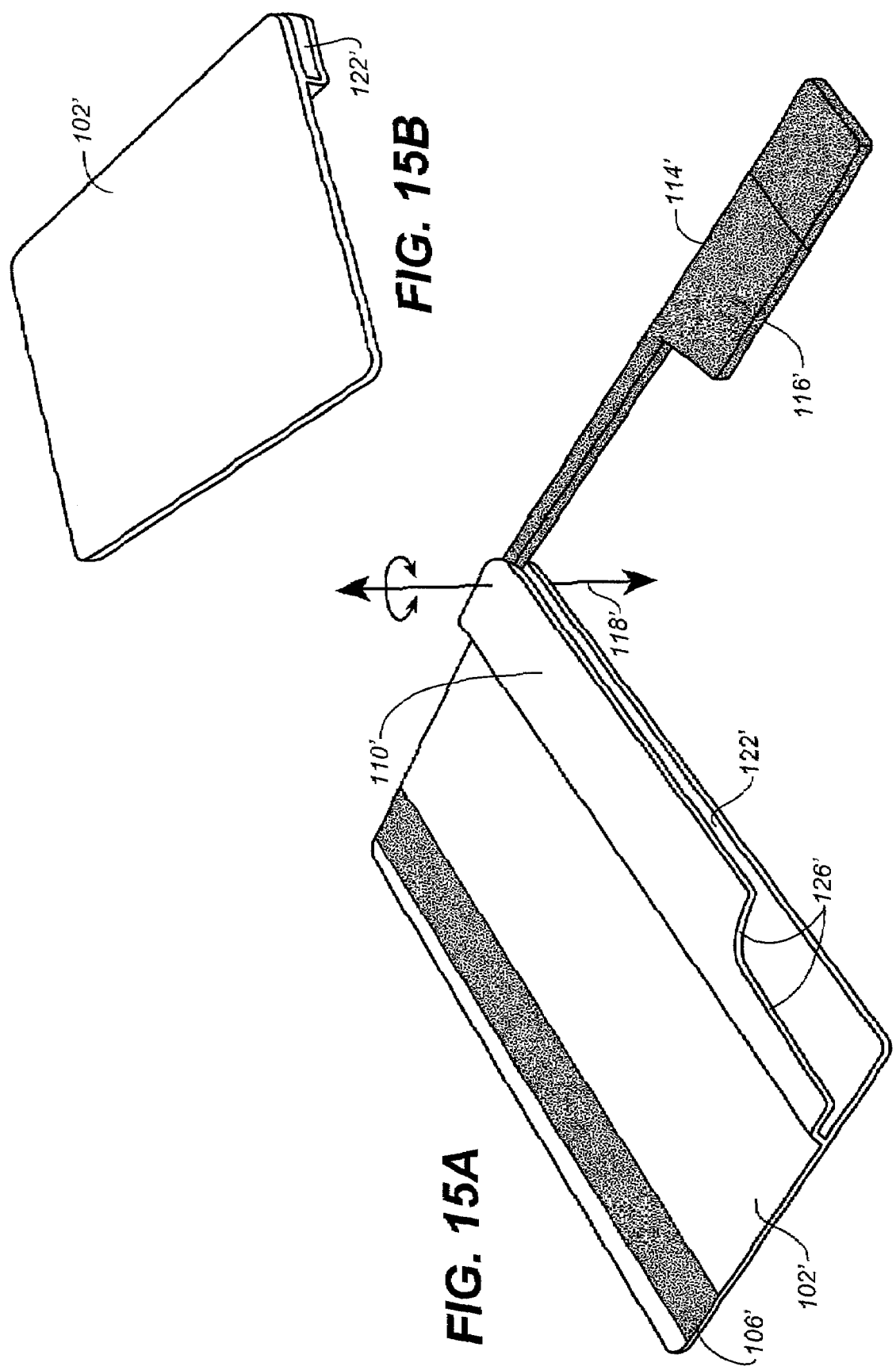

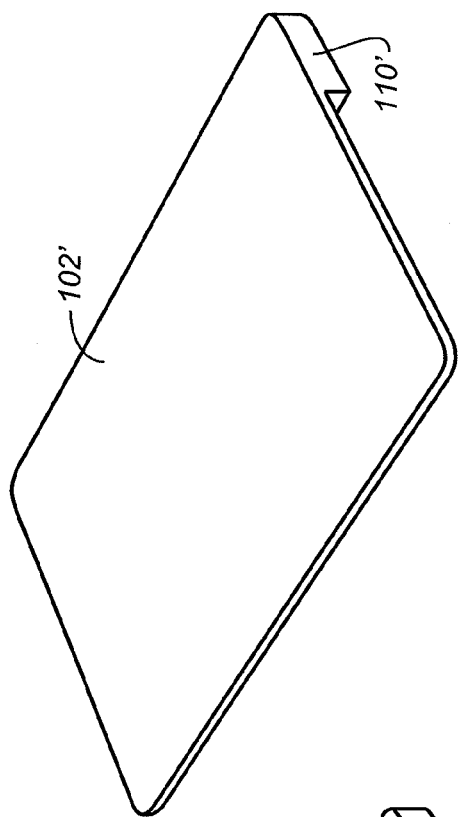
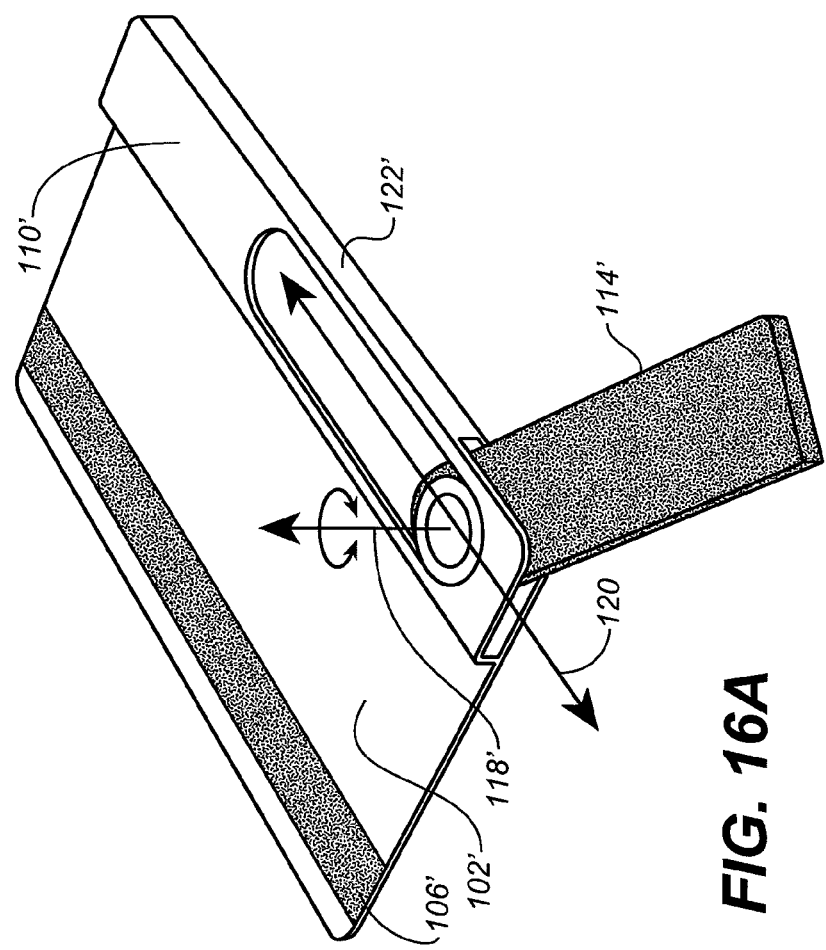

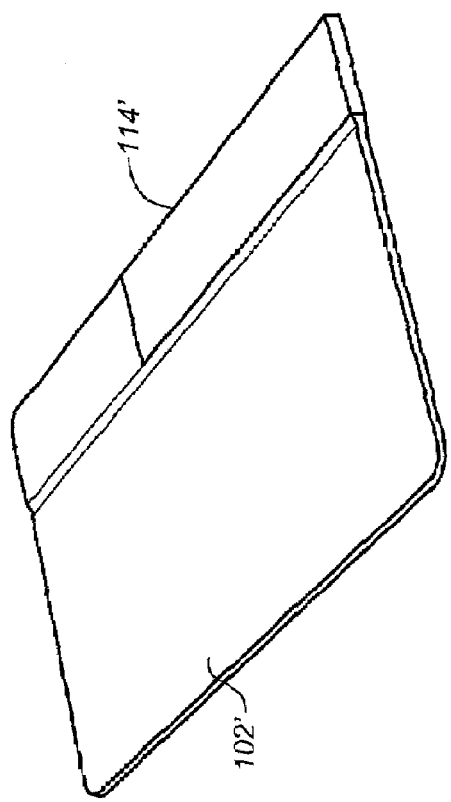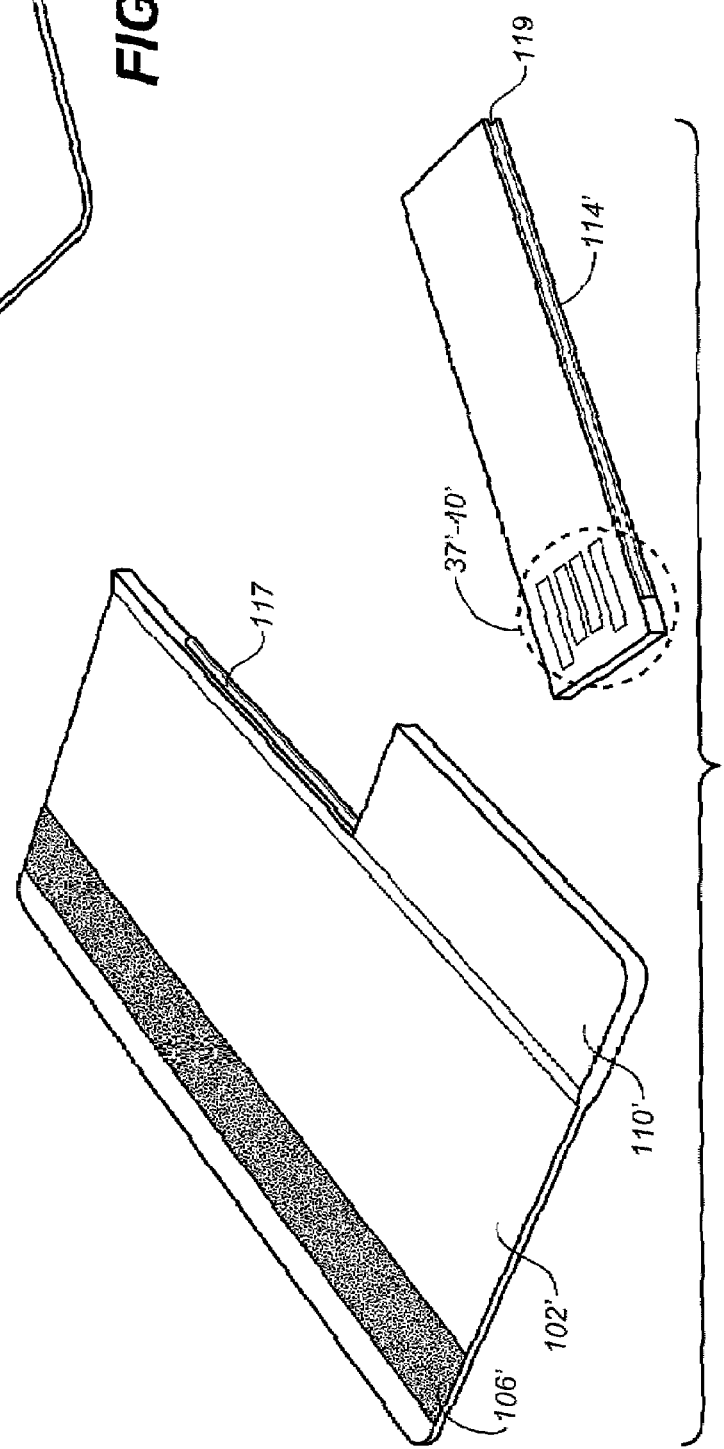

CREDIT CARD SIZED USB FLASH DRIVE

CROSS REFERENCE TO RELATED APPLICATIONS

This application is related to and claims priority from U.S. Provisional Patent Application No. 60/745,813 to Gonzalez et al., filed Apr. 27, 2006.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

FIELD OF THE INVENTION

The present application is generally related to portable flash memory based mass storage devices and credit cards.

BACKGROUND

A digital savvy consumer is accustomed to having files at the ready wherever he goes, and doing so without having to carry a large host device such as a digital camera, cellular telephone or a standard/dedicated memory card or USB flash drive would be quite convenient.

SUMMARY

The great majority of consumers almost always carry a credit card. Therefore, it provides a convenient medium for storing user files. However, the standard credit card is quite thin and incorporating the flash memory hardware and the connectors in a thin and convenient package that consumers will readily adopt is a challenge.

Embodiments of the present invention act as a hard drive with a credit card like size, conveniently transported in a wallet or purse along with other identification cards, automatic teller cards, credit cards and the like.

Some embodiments may also be read by a credit card reader, and therefore comprise a portion, with a magnetic stripe, thin enough to slide through a standard credit card reader. This results in a truly multi-purpose device in areas where the magnetic stripe is the accepted medium for carrying out transactions, such as the United States. In other countries where a Smart Card contact pattern is the accepted communication medium, a thin card is also dictated, and the contact pattern would therefore be present on a portion of the device thin enough to be read by commercial card readers at Smart Card point of sale locations and teller machines etc.

Certain embodiments incorporate a double axis hinge that conveniently covers the connector used to communicate with a host device while not it is not in use. The cover carried by the card is rotatable by hand between at least first and second positions about an axis extending across a width of the card, the contacts being covered when the cover is in the first position and exposed for insertion into a female receptacle of a host when the cover is in the second position.

Other embodiments include a member with the USB connector at the free that slides and/or pivots to enable insertion.

Yet other embodiments include a member that may be physically removed for insertion, or that remains connected but can be ejected or rotated to be coupled with a host device.

Yet other embodiments utilize a flexible material or substrate in the body of the card that can be bent so that either part of the card body or part of the member bends in order to facilitate coupling with the host device.

Communications for purposes of mass storage and for carrying out transactions can also be made without plugging the drive in, through near field communications circuitry provided in the device. The device may also communicate via a magnetic stripe interface, Smart Card interface, or through the contacts of a male connector that physically plugs into a female receptacle of the host device.

BRIEF DESCRIPTION OF THE FIGURES

FIGS. 1A, 1B, 2A, 2B, 3A, 3B, 3C, 4A, 4B, 4C, 5A, 5B, 5C, 6A, 6B, 6C, 7, 7A, 8, 8A, and 9 are different views of a hinged embodiment of a credit card sized USB flash drive ("CCFD").

FIGS. 10A, 10B, 11A, 11B, 12A, 12B, 13A, and 13B are different views of another hinged embodiment of a CCFD.

FIGS. 15A and 15B illustrate a flexible tether embodiment of a CCFD.

FIGS. 16A and 16B illustrate a slide and pivot embodiment of a credit card sized USB flash drive.

FIGS. 17A and 17B illustrate a holder type embodiment of a CCFD.

DETAILED DESCRIPTION OF THE PREFERRED EMBODIMENTS

The present invention comprises a flash memory based mass storage drive having the length and width of a credit card, so that it may easily fit in a wallet. Some preferred embodiments of the card include a body where at least some portion of the body has a thickness of a standard credit card so that a magnetic stripe or Smart Card interface contacts located at that portion can be easily run through a standard credit card reader (including an ATM) or other point of sale ("POS") device. This thickness of the CCFD may vary depending on the credit card reader's ability to accept cards of varying thickness. In some embodiments, the thickness of the CCFD is substantially uniform, whereas in some other embodiments, some portion of the card may be thicker than another portion of the card. In such a case, the thicker portion or portions may be where the electronic components and/or connector are located.

While it is desirable to have the body of the CCFD relatively thin, for example, the thickness of a standard credit card (approx. 0.8 mm), in embodiments of the drive incorporating a type A USB connector, the connector, even without a shield, must be somewhat thicker (approx. 1.7 mm) than a standard credit card in order for the connector to seat properly in a USB socket and for the contacts of the drive to make proper contact with the contacts of a host receptacle.

A USB flash drive comprises a mass storage flash memory, which may be comprised of one or more integrated circuit die. As a credit card form factor has a large surface area, the integrated circuit die can be distributed over the area of the card. In such an embodiment the integrated circuit die need not be stacked, and the thickness of the credit card can be minimized. Alternatively, the integrated circuit die can be located in a centralized area. That area may be near the host connector (which is preferably a USB connector) and/or on a moveable member that also comprises the connector. All or a portion of the member can be as thick as required for proper seating in a USB receptacle. In such a case, the die may be stacked if necessary as the thicker portion of the card/member will easily accommodate the height of the stacked die.

The following figures illustrate different embodiments of the present invention. Different aspects of the embodiments may be interchanged with other of the embodiments.

Figure 1A:
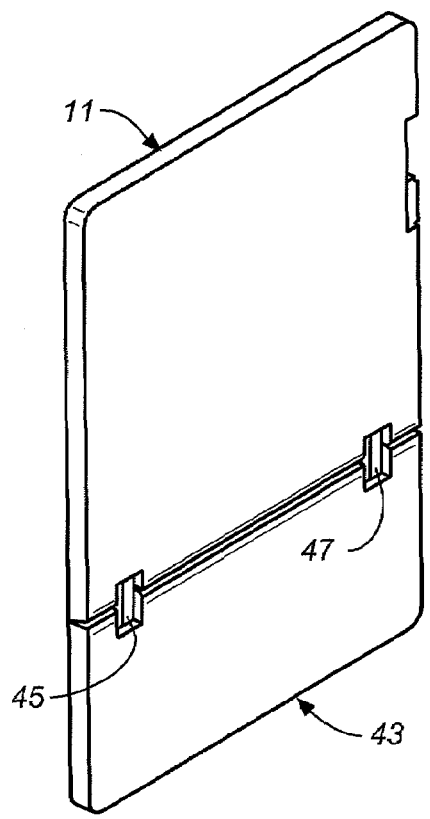
Figure 1B:
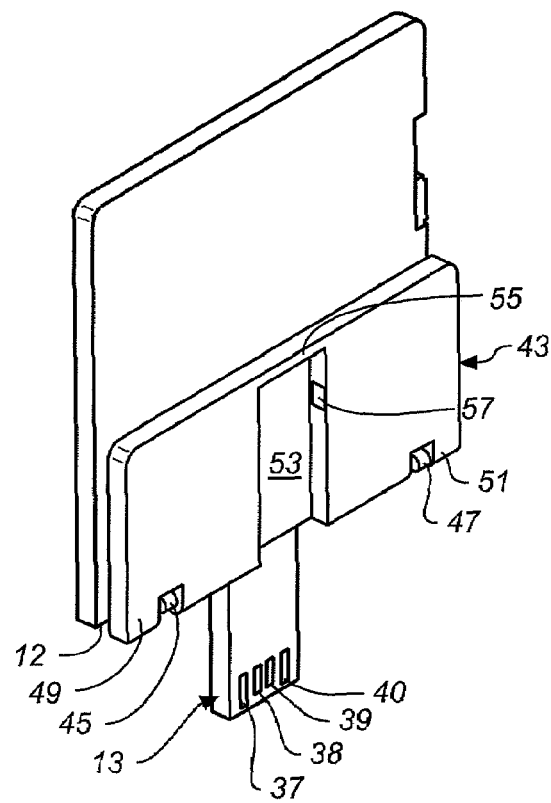
Figure 1C:
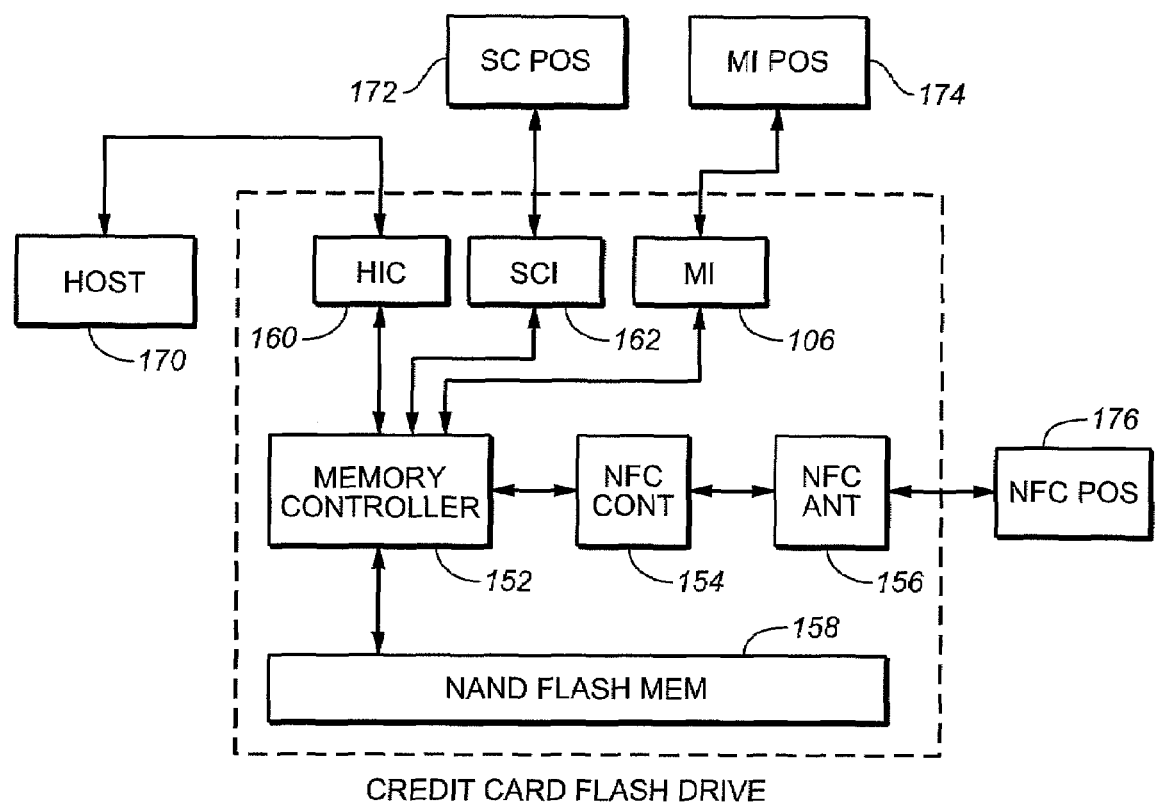
FIG. 1C is a schematic diagram of some of the components of a CCFD.

FIG. 1C is a block diagram of the main components of a CCFD. The credit card flash drive comprises a memory controller 152 that controls read/write operations to/from the mass storage flash memory 158. The memory controller is coupled to the host interface connector 160 and also serves to control the data transfer to/from a host device when the drive is plugged into the host 170. The host interface is preferably a USB interface and the host interface connector 160 is thus one of the many types of available USB connectors. Other types of host interface connections such as IEE1394 (a.k.a. Firewire) or other high speed type connectors/interfaces may also be used. In some embodiments, the drive also comprises near field communications ("NFC") capability including an NFC controller 154 and NFC antenna 156. In certain embodiments, the NFC controller is eliminated and the functionality integrated into memory controller 152. The NFC antenna communicates with NFC point of sale device 176 to execute transactions, and may also communicate data to/from host 170 in lieu of using physical connector 160.

Some embodiments may also comprise a Smart Card interface 162 for communicating with a Smart Card enabled POS device 172. The Smart Card interface is preferably controlled by memory controller 152, but a separate Smart Card controller (not shown) may instead be integrated into the drive. While the data transfer rate/methodology specified by the Smart Card specification is generally considered inadequate for mass data transfer, the Smart Card interface is desirable because it enables use with Smart Card readers and thus allows for transactions in the numerous establishments equipped with such readers. Magnetic interface ("MI") 106, typically a standard credit card magnetic stripe, is provided to interface and carry out transactions with magnetic interface POS systems 174. MI 106 may be self contained or may interface with memory controller 152 for storing and retrieving transactional data in and from flash memory 158. For more information on integration of a Smart Card controller in the mass storage drive and for NFC communications, please refer to application Ser. No. 11/321,833 entitled "Methods Used in a Nested Memory System With Near Field Communications Capability." MI 106 is preferably on a portion of the drive thin enough to be read by a standard credit card/ATM reader, as are the contacts of Smart Card interface ("SCI") 162. For simplicity, the contacts of the Smart Card interface will not be shown in various views of the drives, but may be present at a sufficiently thin portion of the drive, typically near where MI 106 is shown. For more information on the smart card contacts please refer to the ISO 7816 standards which have been incorporated by reference in the entirety. When the CCFD is connected with a host device, and the host is connected to the Internet, financial and user identity data stored in the flash memory may be transmitted to processing entities to facilitate transactions. This is in addition to in conjunction with standard credit card transaction processing data transmitted via MI 106 and/or SCI 162, and/or the NFC hardware.

FIGS. 1A, 1B, 2A, 2B, 3A, 3B, 4A, 4B, 4C, 5A, 5B, 5C, 6A, 6B, 6C, 7, 7A, 8, 8A, 9, 10A, 10B, 11A, 11B, 12A, 12B, 13A, and 13B are different views of hinged embodiments of a CCFD.

Referring to the figures, an example CCFD will be described. A predominately rectangular main body portion 11, having the length and width of a credit card (approximately 84 mm×54 mm) has a rectangular extension 13 formed as part of the card to provide an interface for the mass storage of data, in this case a USB compatible plug. Since the extension 13 is narrower than the portion 11, end surfaces 12 and 14 of the main body portion 11 exist on either side of the extension 13. Four electrical contacts 37-40, arranged according to the USB specifications, are provided on the flat surface of the extension 13.

Figure 2A:
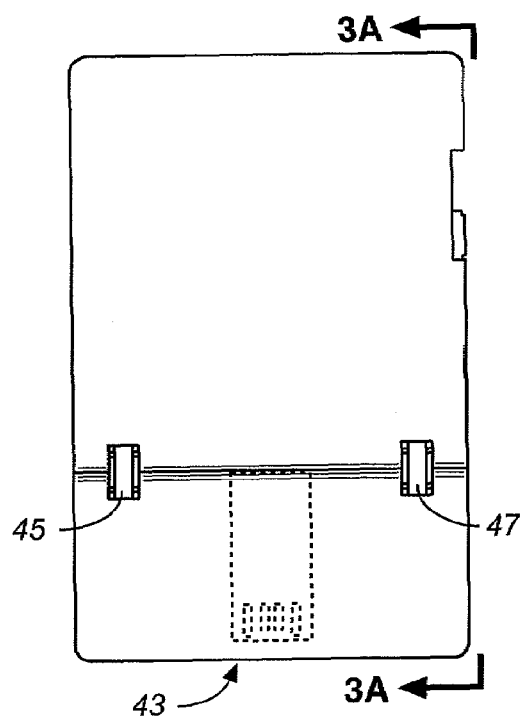
Figure 2B:
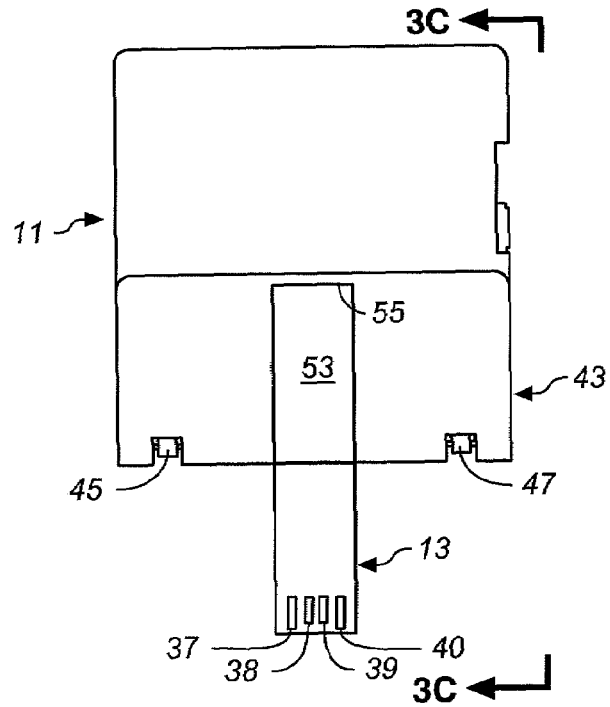

In order to protect the contacts 37-40 when not being used, a cover 43 is rotatably connected with the card so that it may be closed to cover the contacts 37-40 when they are not being used (the position of FIGS. 1A, 2A and 3A) and opened to expose the contacts 37-40 when the extension 13 is inserted into a mating receptacle (the position of FIGS. 1B, 2B and 3C). These positions are shown to be one hundred eighty degrees apart. In this specific example, the cover 43 is attached to the card portion 11 at its end surfaces 12 and 14 by respective hinges 45 and 47 that allow for such rotation of the cover 43 by hand. The cover 43 has thick side portions 49 and 51 to which the hinges 45 and 47 are respectively connected. The side portions 49 and 51 fit around the extension 13 when the cover is closed, and a thin layer 53 of material spanning between the side portions 49 and 51 covers the contacts when the cover 43 is closed. The layer 53 has a size that is approximately that of the extension 13 in order to cover it when the cover 43 is closed. An end portion 55 spanning the side portions 49 and 51 is also preferably provided as part of the cover 43. When the cover 43 is closed, its end portion 55 fits over an extreme end of the extension 13.

In order to be compatible with the USB specifications, the addition 13 has a minimum length of 12 mm. from the ends 12 and 14 of the main body portion 11 and has a width of 12.35 mm. The main body portion 11 of the memory card of FIGS. 1A and 1B, in this specific example, is about the width of a standard credit card, which is about 54 mm. The thickness may vary in the different embodiments. These dimensions may vary from those stated, if a non standard credit card or USB plug is desired. Also, different styles of USB plugs may be utilized. For example, a smaller USB plug may be utilized. For details on the various types of USB plugs and receptacles, and other information relating to the USB standard, please refer to the "Universal Serial Bus Specification" revision 2.0, dated Apr. 27, 2000 which is hereby incorporated by reference in the entirety.

The cover 43 is made to have the same outside width of 54 mm. and its side portions 49 and 51 the same thickness as the card portion 11. The extension 13 has a thickness 43 of 1.70 mm. in the region of the contacts 37-40, according to the USB specifications.

In order to hold the cover closed, a latch 57 may be provided on the inside of one or both of the side portions 49 and 51 of the cover 43 to snap into mating receptacle(s) (not shown) on the side walls of the extension 13. When the cover 43 is closed, the CCFD can be stored in a wallet or elsewhere without worry of damaging the contacts.

Although the cover is shown to be same width as the card portion 11, and the extension 13 is shown to be in the middle of the short side of the card, both the location of the extension and the size of the cover may vary. For example, rather than being located in the middle of the short side of the card, the extension 13 may be offset some amount from the centerline. In such a case, the cover 43 may still have the same width as main portion 11, or may have a smaller width. In such a case the main portion 11 may have an "L" shape rather than a rectangular shape, with a portion of the L having the full length of a credit card, with a magnetic stripe (shown in the embodiments of FIGS. 10-13) on a sufficiently thin portion suitable to be swiped and read by a credit card reader. As mentioned previously, a Smart Card contact pattern/interface may also be provided on suitably thin portion of the drive. Alternatively, the extension 13 and cover 43 may be aligned 90 degrees from that shown in the figures. Alternatively, they may be aligned so that extension 13 and cover 43 have an alignment not orthogonal to either the length or width of the card.

An appropriate latch (not shown) may additionally be included to hold the cover 43 in its opened position.

Again, while the USB connector is currently preferable, preferences tend to change, and other standards for the connector may be utilized. For example, the IEEE 1394 standard could be used instead, or an undeveloped standard could be implemented.

The specific hinges 45 and 47 shown in the example CCFD of the figures are sometimes called "dog bone" hinges. They are of rigid material. One end of each of these elongated hinges is attached to the CCFD portion 11 to rotate about an axis 61 that extends across the width of the card through its main portion 11. Another end of each of the hinges 45 and 47 is attached to the cover 43 to rotate about an axis 63 that extends across the width of the cover 43. Both of the axes of rotation 61 and 63 are stationary with respect to their respective CCFD portion 11 and cover 43. During movement of the cover between its opened and closed positions, the axis 63 moves normal to the memory card to allow the cover 43 to adjust between the different levels of the CCFD's top surface. It will also be noted from the views of FIGS. 3A-3C that the mating edges of the cover 43 and main CCFD portion 11 are curved to allow smooth motion between them as the cover 43 is moved by hand between its open and closed positions. The axis 63 also moves laterally along the length of the memory card as the cover is being opened or closed.

This hinge structure can also be modified to provide a detent that holds the cover 43 in its closed position (FIG. 3A), in place of the latch 57 (FIG. 1B), and in its opened position (FIG. 3C). One way to do so is to square off the ends of the rigid hinges 45 and 47 and provide mating rectangular receptacles in the card portion 11 and cover 43 that latch the cover at 0° and 90° with respect to the hinges but allows free rotation between those positions. An alternate structure replaces the rounded edges of the CCFD portion 11 and the cover 43 with substantially square surfaces, and the hinges 45 and 47 are provided some degree of elasticity so that they pull these planar edges together when the cover 43 is closed. As the cover is then opened by hand, the hinges stretch to allow the edge of the cover to rotate over the edge of the CCFD portion 11 and then pull the cover and body together again after the cover has been rotated into its opened position.

Other alternatives to this specific hinge structure can certainly be used, so long as the cover 43 is rotatable by hand with respect to the card portions 11 and 13 about one or more axes extending across the width of the card. A different type of solid mechanical hinge can be used, for example. Or something altogether different can be used. A flexible member adhered to the cover and the main CCFD portion 11, for example, may be substituted for the mechanical hinges. An example of the flexible member is polyimide film bonded or welded to the pieces.

FIGS. 4A-28 show embodiments of a CCFD that implements certain aspects of the CCFD designs described above. Elements of the embodiments that correspond with elements of FIGS. 1A-10B described above are therefore identified with the same reference numbers but with a prime (') added. Many of these corresponding elements are therefore not described again, in which case the prior descriptions of the elements are incorporated into the following description.

A main body portion 11' of the CCFD of FIGS. 4A-13B has a cover 43' attached to the body 11' by solid, rigid hinges 45' and 47' that have the same shape. The cover 43' is rotatable with respect to the body 11' over a range of substantially 180 degrees between closed (FIG. 4A) and opened (FIG. 4C) positions. The relative dimensions of the body 11' and cover 43' are such that the cover overlies a portion of the card contacts 15'-23' when the cover is opened (FIG. 4C). A USB plug extension 13' is exposed for use when the cover is opened. When the cover is closed (FIG. 4A), the CCFD has the outline of credit card and some embodiments can be used as a credit card.

Figure 4A:
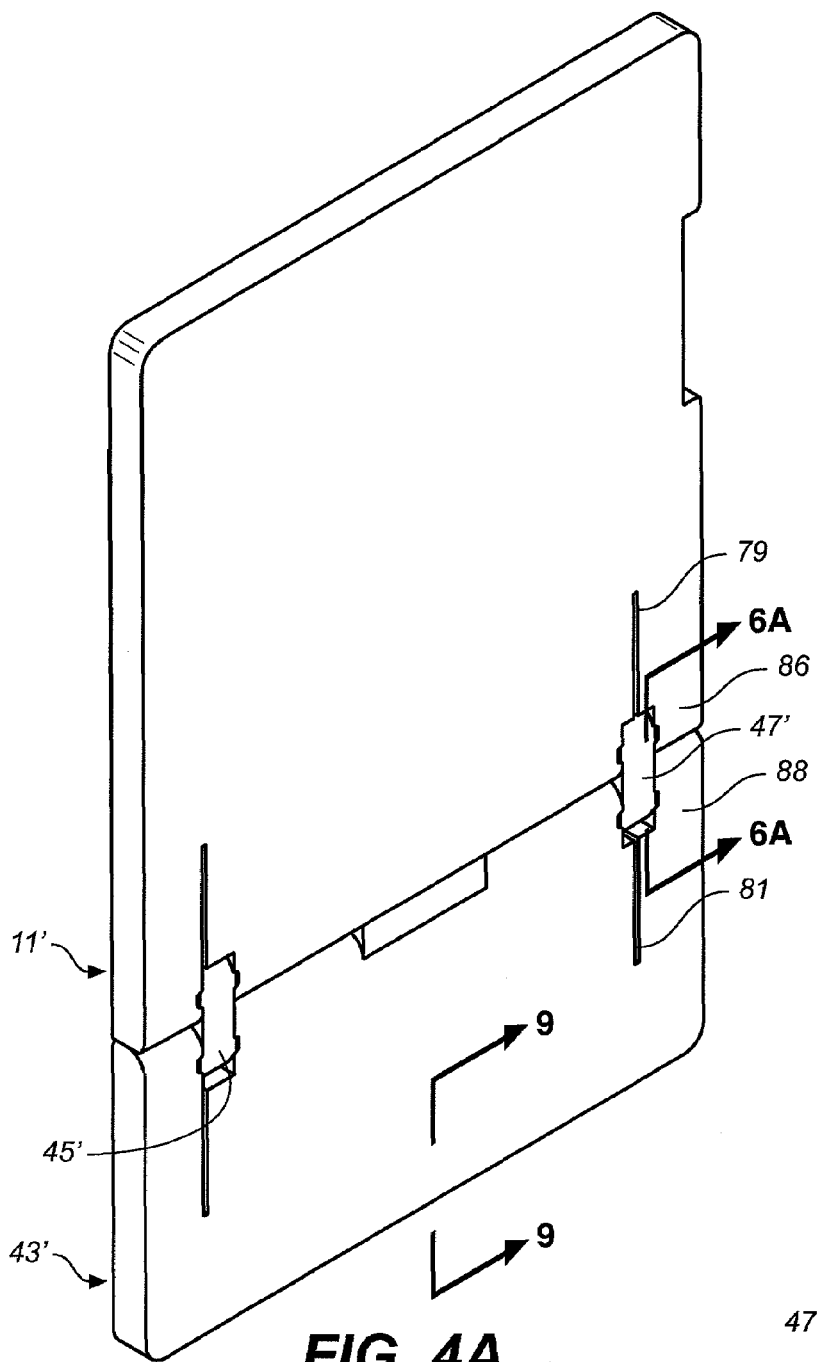
Figure 4B:
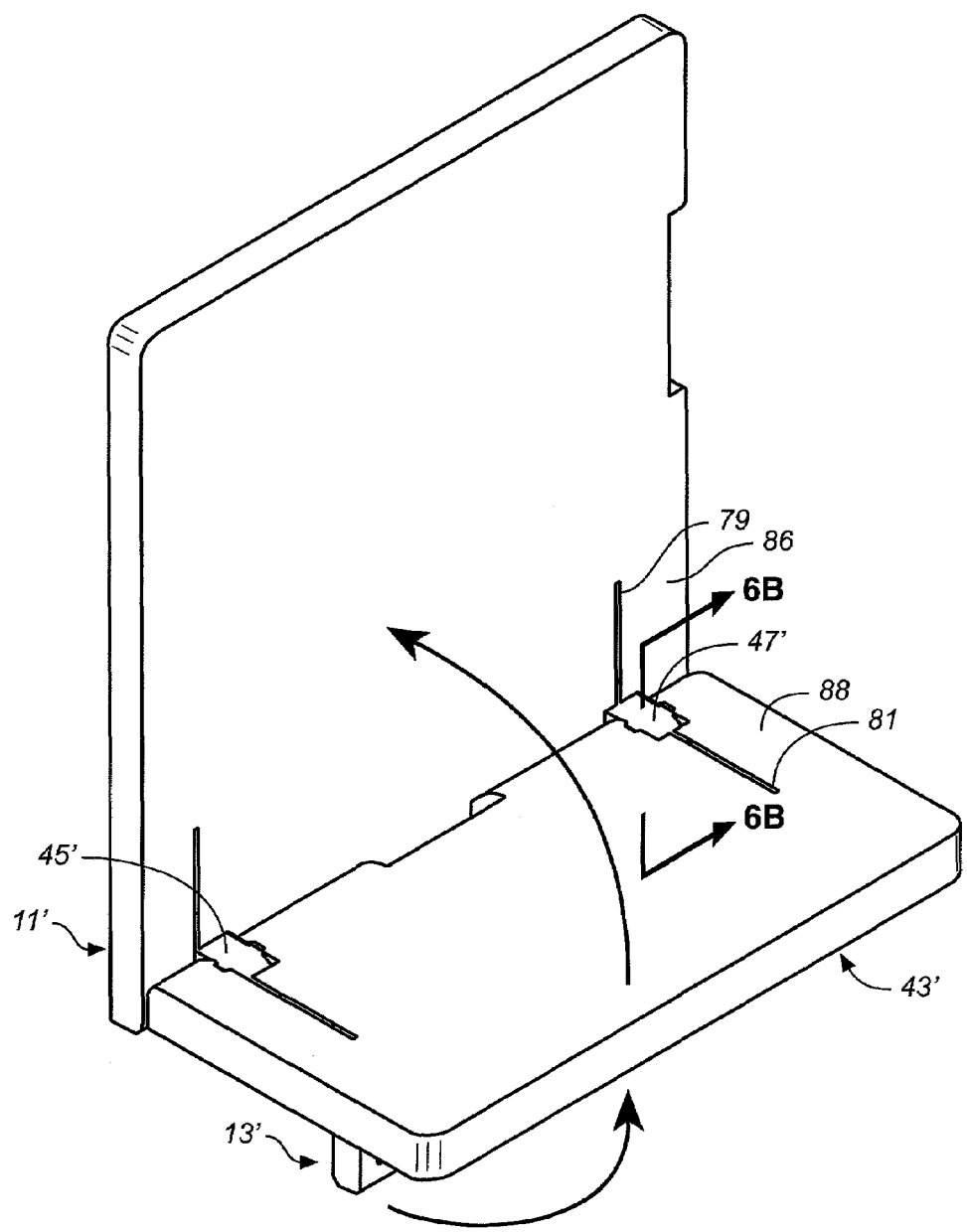
Figure 9:
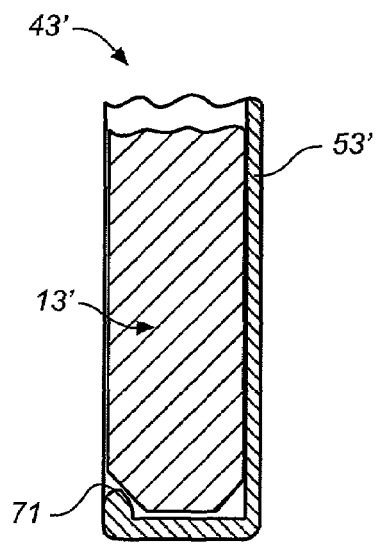
Figure 8A:
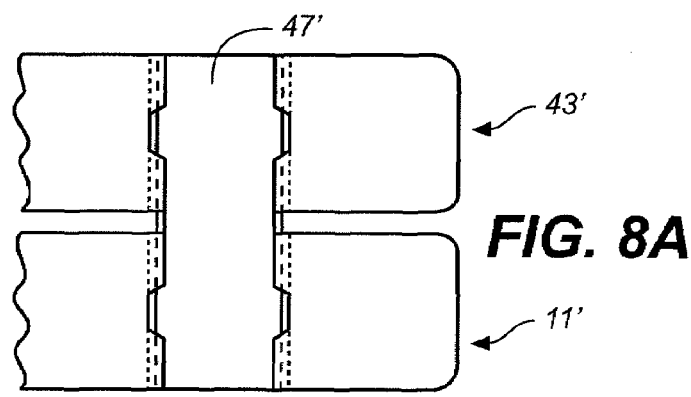

The shapes of the hinges and mating surfaces of the card body and cover provide three stable positions of the cover: closed (FIG. 4A), opened (FIG. 4C) and an optional intermediate position (FIG. 4B). The cover is latched into one of these stable positions by a user manipulating the parts with his or her fingers. They are separated by substantially 90 degrees. The latching may be overcome by gentle finger force that rotates the cover out of any one of these stable positions. Although this is, in this example, the only mechanism that holds the cover fully opened (FIG. 4C), a more positive latch is also included to hold the cover closed (FIG. 4A). As best shown in FIG. 9, a lip 71 is provided on an underside of the cover 43' that flexes outward around the extension 13' as the cover is closed to positively latch the extension 13' when the cover reaches the position shown.

A layer 53' across the cover is preferably provided with indentations 73-76 having positions and shapes that match electrical contacts 37'-40' raised above a surface of the extension 13'. When the cover is closed (FIG. 4A), the contacts fit within these indentations to allow the cover layer 53' to abut against surface area of the extension 13' surrounding the contacts 37'-40'.

The structure and operation of the hinge 47' will now be described. The structure and operation of the hinge 45' is the same. A slot 79 extends completely through the body 11' for a distance from its edge where the hinge 47' is held. Similarly, a slot 81 goes all the way through the cover 43' for a distance from an edge that retains the hinge 47'. The hinge 47' is held within these slots. These slots form respective strips 86 and 88 that flex outward as the hinge 47' is rotated with respect to the respective body 11' and cover 43' between the three stable positions, thereby expanding the width of the slots 79 and 81. The strips 86 and 88 resiliently return to their rest positions when the cover is in one of the three stable positions shown in FIGS. 4A, 4B and 4C, urging against the hinge 47'.

The structure and operation of the hinge 47' may best be explained by reference to the exploded views of FIGS. 6A, 6B and 6C that show relative positions of the parts when the cover is in the closed, intermediate and opened positions of respective FIGS. 4A, 4B and 4C. The hinge 47' is a solid plastic piece with first and second cylindrical axles 81 and 83 that each extend out of opposite sides of the part and are spaced apart along its length. The hinge 47' therefore rotates about axes 82 and 84 of the respective axles. A pattern of ridges 85, 87 and 89 protrude out from a planar surface 91 on one side. The structure on the opposite side is the same. The ridge 85 extends along the length of the hinge 47' through both of the axles 81 and 83. The ridges 87 and 89 extend across the width of the hinge through one of the axles 81 and 83, respectively, perpendicular to the ridge 85. In cross-section, the ridges are narrower at their tops than at their bottoms where they intersect the hinge surface 91. In this example, their sidewalls are also planar and intersect top planar surfaces of the ridges and the hinge surface 91 with a common angle other than ninety degrees.

Surfaces of the body 11' and cover 43' that engage the sides of the hinge 47' have a complementarily shape. The surfaces that engage one side of the hinge 47' are shown in FIGS. 6A, 6B and 6C. A cylindrically shaped hole 95 on the main body 11' receives one end of the axle 81 on the backside of the hinge 47' in a manner that allows the axle to rotate with respect thereto. Similarly, the cover 43' includes a cylindrically shaped hole 97 into which one end of the axle 83 is inserted to rotate with respect to the cover. The body 11' includes channels 99 and 101 that extend through the opening 95 and are perpendicular with each other. Similarly, channels 103 and 105 pass through the opening 97 of the cover 43' and are perpendicular with each other. In cross-section, the channels 99, 101, 103 and 105 are the same along their lengths and mate with the common shaped ridges 85, 87 and 89 of the hinge 47'. In this example, the channels have planar bottom surfaces that are narrower than the widths of their openings, and their sidewalls are also planar. The sidewalls therefore intersect the bottom surface of the grooves and a planar surface surrounding the grooves with angles that are other than ninety degrees.

Figure 6A:
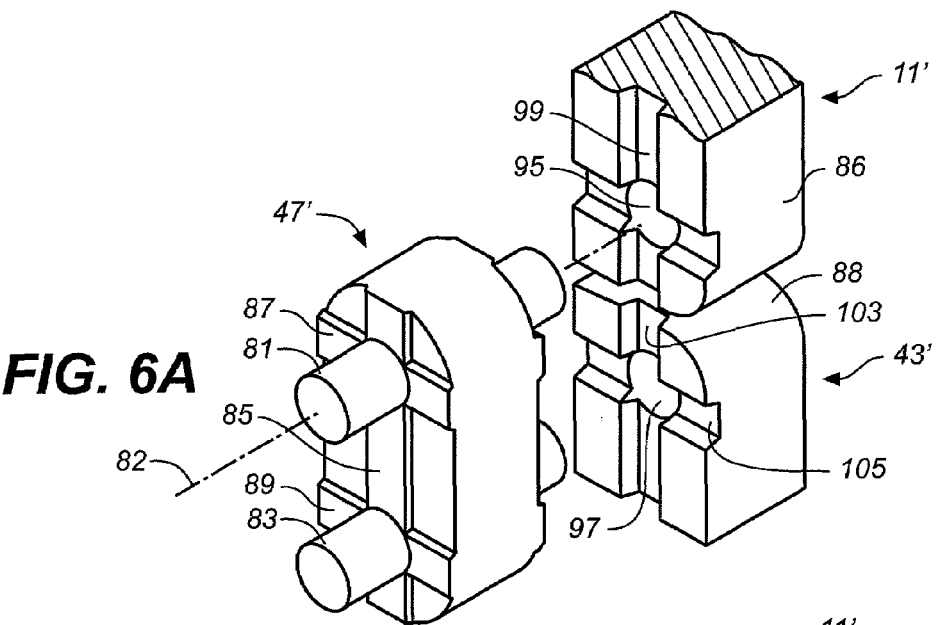
Figure 6B:
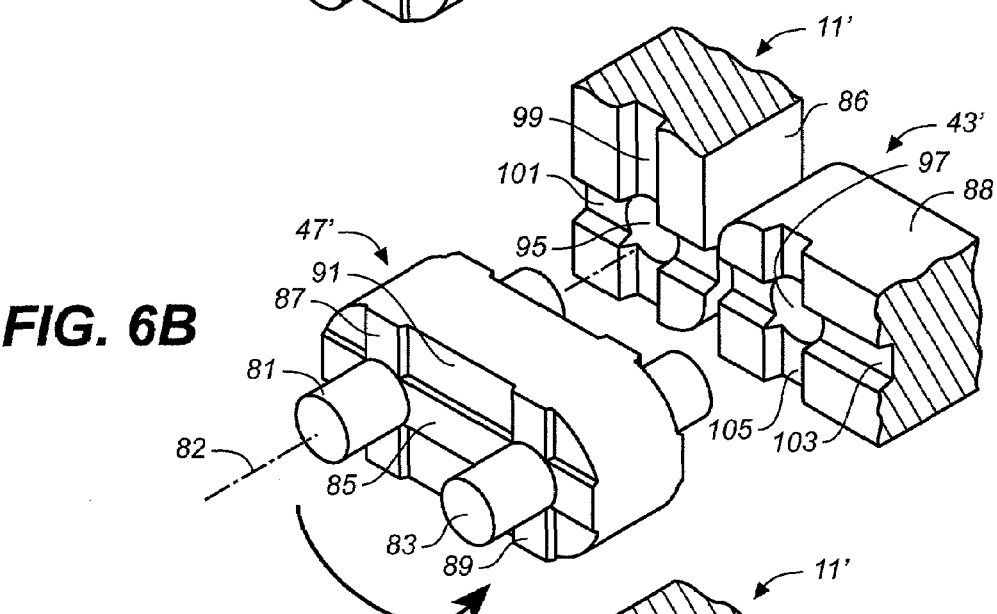
Figure 6C:
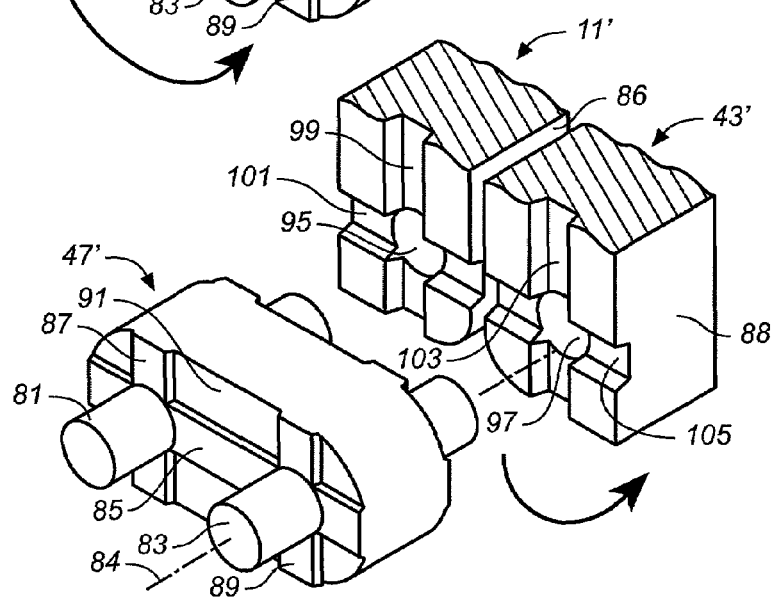
Figure 7:
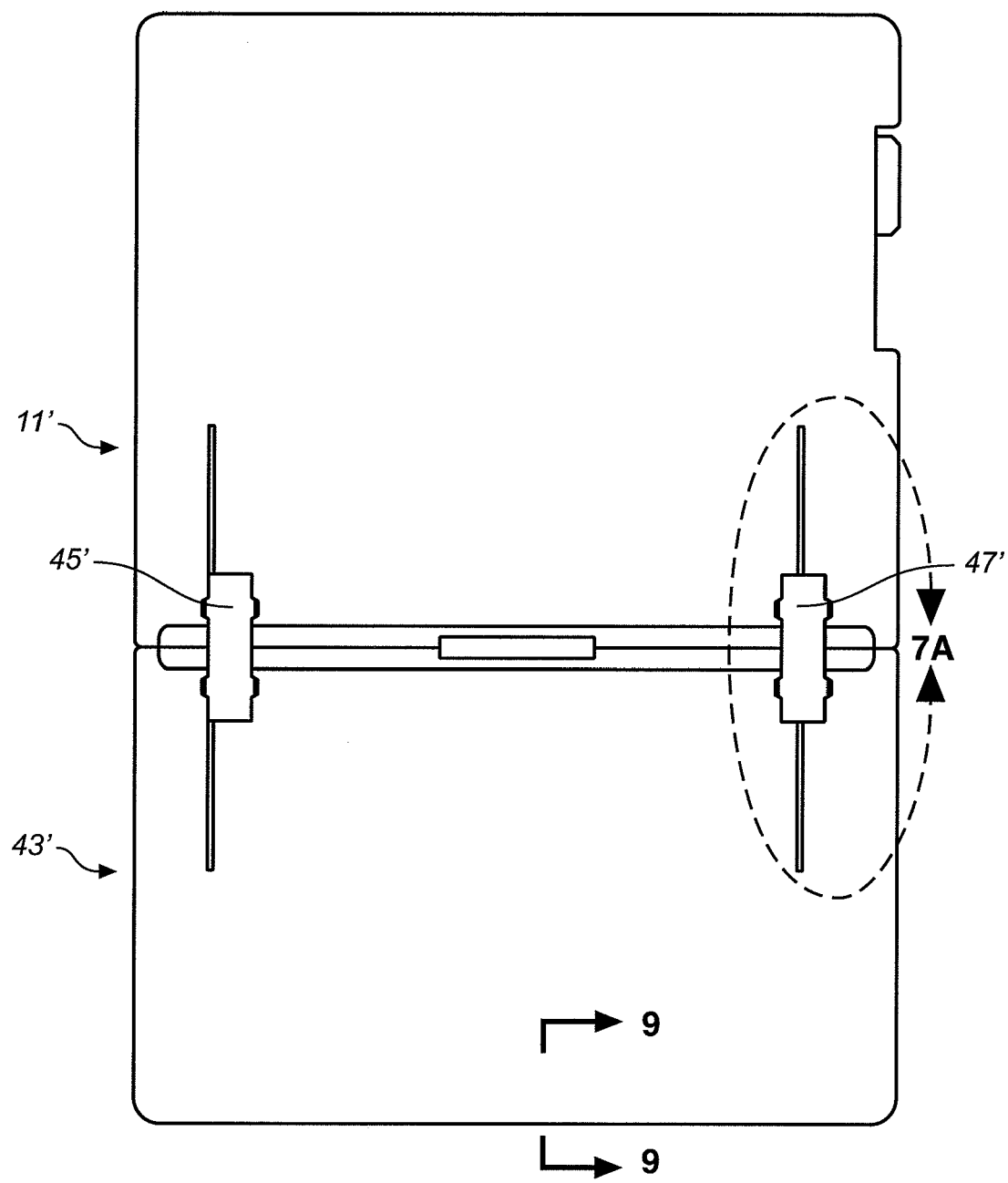
Figure 8:
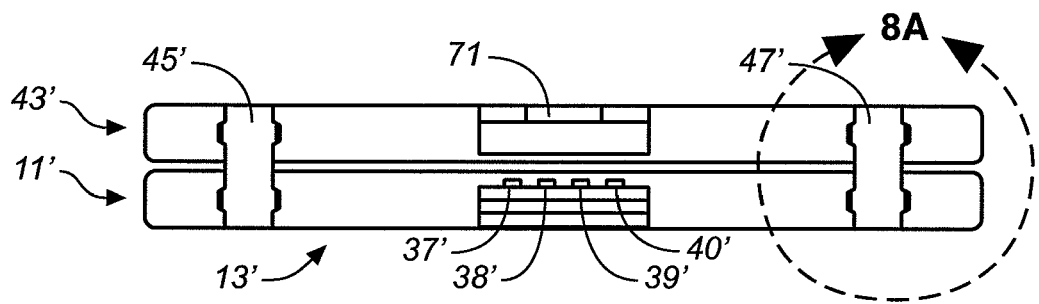
Figure 7A:
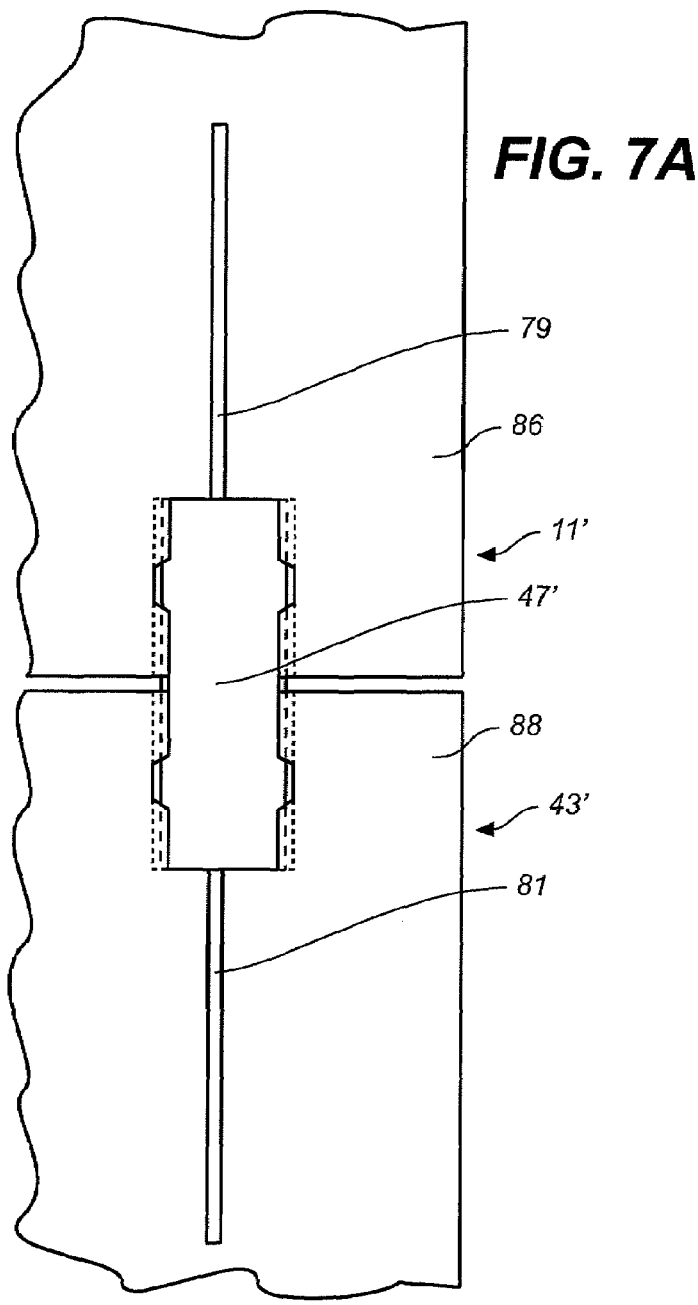

Operation of the hinge 47' when the cover 43' is opened or closed can best be seen by comparing the views of FIGS. 6A, 6B and 6C. FIG. 6A shows the relative position of the parts when the cover is closed (see FIG. 4A). The ridge 85 on the opposite side of the hinge 47' is positioned in the channels 99 and 105 of the body 11' and cover 43', respectively. The ridge 87 on the opposite side of the hinge is positioned in the channel 101 of the body 11', and the ridge 89 in the channel 105 of the cover 43'

As the cover is opened, the hinge 47' does not move with respect to the cover 43' but does rotate about the axis 82 with respect to the body 11'. As the cover begins to rotate, the ridges 85 and 87 of the hinge 47' move out of the respective channels 99 and 101 of the body 11'. This is possible since the strip 86 is resiliently movable to the side away from the hinge. The mating sloping sides of the ridges and channels causes a caming action that pushes against the resiliently loaded strip 86 as the ridges are forced out of the channels. When the cover has been rotated ninety degrees to the intermediate position of FIG. 4B, the hinge and cooperating surfaces are caused to again engage each other because of the resilience of the strip 86 urging them together. The parts are then in the relative positions shown in FIG. 6B. The ridge 85 is then positioned within the channel 101 of the body 11' and the ridge 87 in the channel 101. The body 11' has not moved but the cover 43' and the hinge 47', which remain locked together, have rotated ninety degrees about the axis 82 with respect to the body 11'.

Figure 4C:
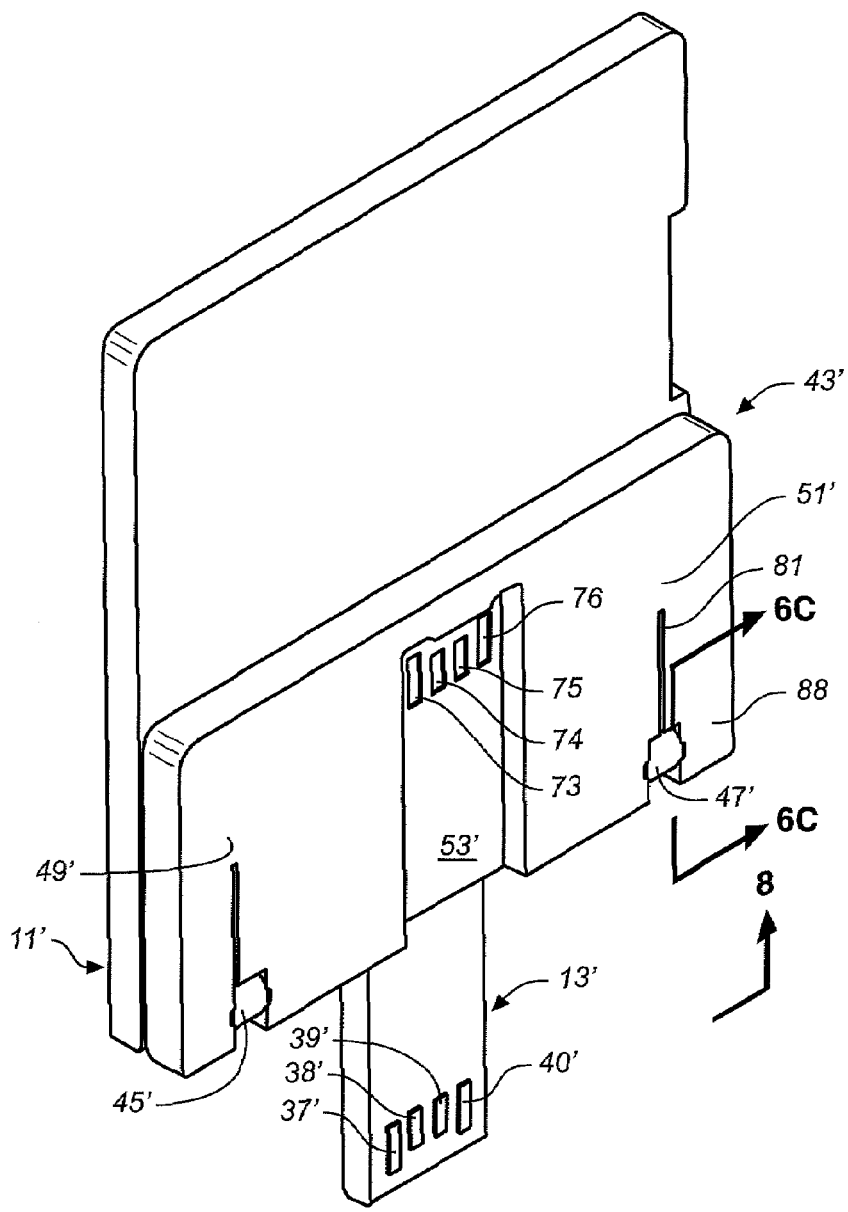

Further rotation of the cover 43' moves the parts to their relative positions shown in FIG. 6C, where the cover is fully opened (see FIG. 4C). The hinge 87' remains locked to the body 11' as the cover 43' is rotated ninety degrees with respect to the hinge 47' about the axis 84. At the beginning of this rotation, the ridges of the hinge move out of the channels of the cover by the cam action that urges the strip 88 laterally away from the hinge. After the cover is rotated ninety degrees, the ridges 85 and 89 of the hinge 47' are urged into the respective channels 105 and 103 of the cover 43', the position shown in FIG. 6C.

It will be noted that the ridge 87 of the hinge 47' and a portion of the ridge 85 adjacent to it mate with the channels 99 and 101 of the card body 11'. If the hinge were free to rotate a full 360 degrees, these mating surface relief patterns would provide four stable rotational positions 90 degrees from each other about the first axis 82. Similarly, the ridge 89 and portion of the ridge 85 adjacent to it that mate with the channels 103 and 105 of the cover provide four similar stable rotatable positions between the hinges and the cover about the second axis 84. The mechanism is constrained, however, in this example, to utilize only two rotatable positions with the body 11' and two rotatable positions with the cover 43'. This combination provides the three stable rotatable positions between the cover and the card body that are illustrated in FIGS. 4A, 4B and 4C.

Although not explicitly shown, the second opposite surface of the hinge 47' is urged against opposing surfaces of the body and cover having the same shapes as those shown in FIGS. 6A, 6B and 6C. The hinge and these other surfaces cooperate in the same manner as described above.

Figure 5A:
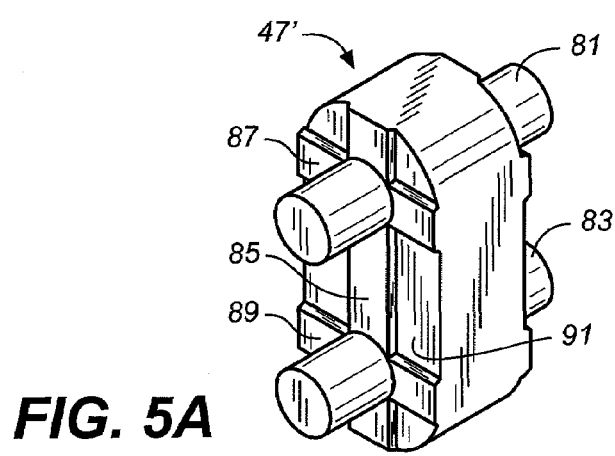
Figure 5B:
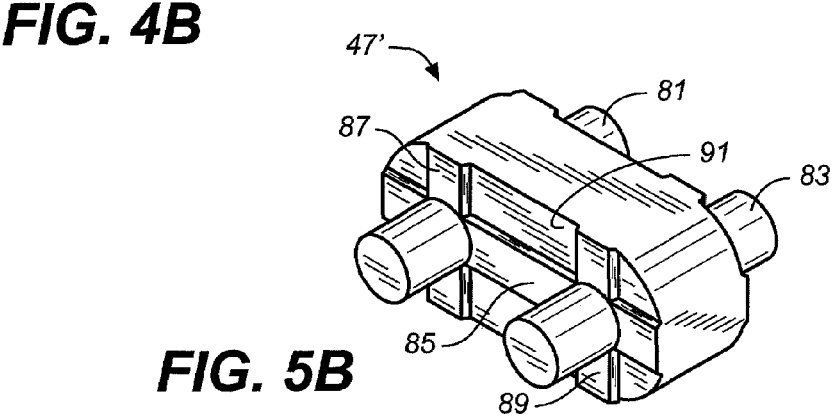
Figure 5C:
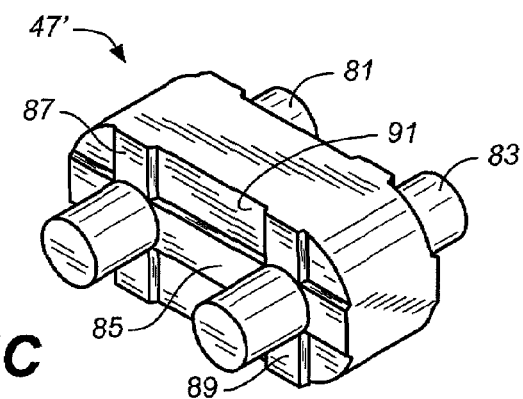

FIGS. 5A, 5B and 5C have not been discussed but it may be noted that they show relative orientations of the hinge 47' for the positions of the covers shown in respective FIGS. 4A, 4B and 4C. FIGS. 10A, 10B, 11A, 11B, 12A, 12B, 13A, and 13B are different views of an embodiment similar to that previously described but having a relatively thinner portion suitable to be swiped through a credit card reader.

Figure 14B:
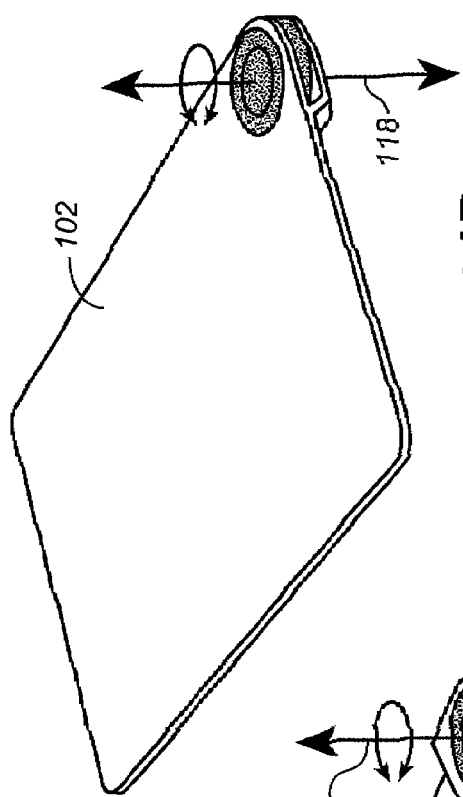
FIGS. 14A and 14B illustrate a pivot embodiment of a CCFD.
Figure 14A:
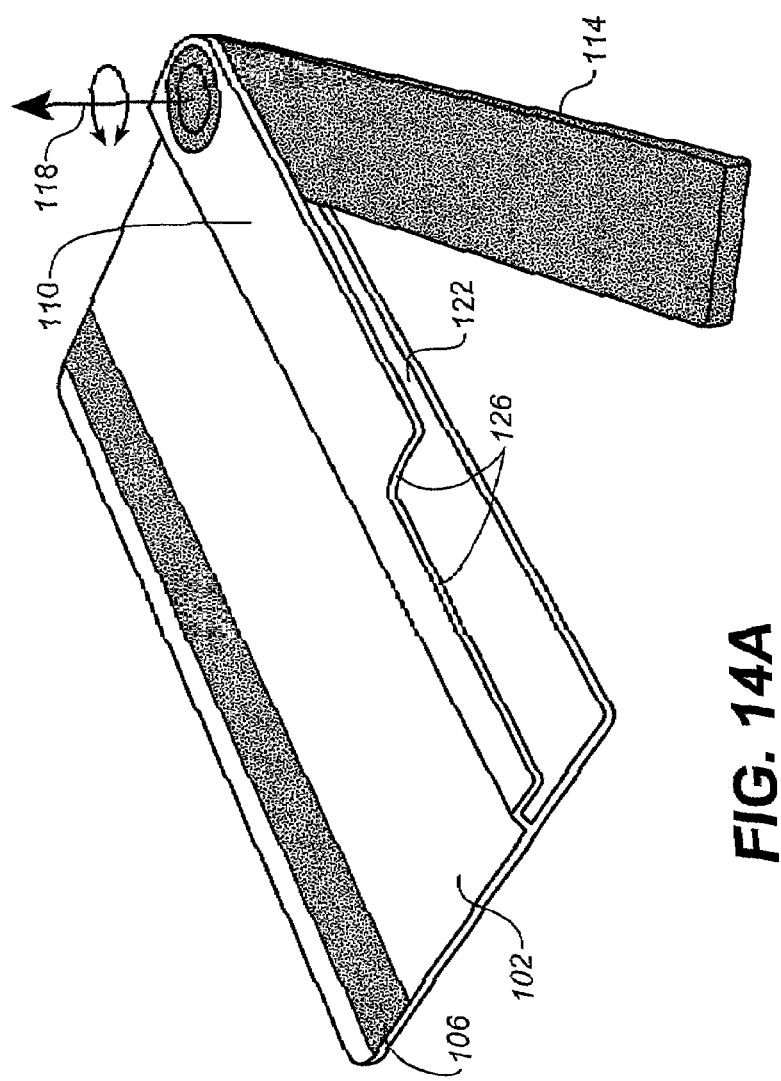
Figure 18:
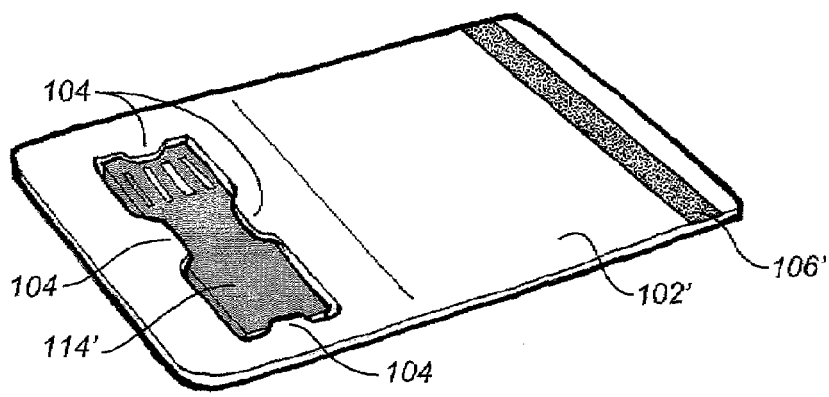
FIG. 18 illustrates another holder type embodiment of a CCFD.

FIGS. 14A-B illustrate a pivot embodiment of a CCFD. The drive in FIG. 14 has a member 114 that rotates or pivots about axis 118. There exists a thin portion 102 and a thicker portion 110. At the end of member 114 distal to axis of rotation or pivot point 118, are the contacts of the USB connector (not shown). The distal portion of member 114 is dimensionally and functionally the same or similar to extension 13 and 13' described earlier and contains the same arrangement of USB contacts. A pocket or sleeve 122 accommodates member 114 for transport or storage. When a user wishes to the plug the drive into a host computer, the user may grip member 114 at cutout 126 and rotate member 114 out of the pocket 122. The pivot allows for 180 degrees or more of rotation, and the long length of the member facilitates insertion into a USB port that may be crowded by other connectors on the back of a host device such as a PC.

It can be seen that in the embodiments shown in FIGS. 10-28 there is a magnetic interface or stripe 106 on a surface of the card. This magnetic stripe is typical of the kind used in credit and ATM cards. It is located on a portion 102 of the card thin enough to be read by a standard swipe through type credit/ATM card reader. As mentioned earlier, a Smart Card interface/contact pattern (not shown) may also be present in portion 102.

FIGS. 15A-B illustrate a flexible tether embodiment of a CCFD. In FIG. 15, the member 114' also pivots about an axis 118' near the corner of the card, however the member includes a flexible portion 116 that acts as a tether. The pivoting about axis 118' may be achieved with a rotating hinge similar to that seen in FIG. 10, and may also rely on the flexibility of portion 116. This flexible portion 116 may stretch, rotate, and bend in any number of ways so that the connector can be easily inserted into a USB port. In one embodiment, the member is co-molded and the tether is flexible rubber, whereas the connector portion is of a less flexible material. In FIG. 15, the member rotates about a moveable axis. The axis of rotation can slide or translate along the long axis of the card, and thus the member can both slide and pivot. Again, this facilitates insertion into USB receptacles that may otherwise be difficult or impossible to access.

FIGS. 16A-B illustrate a slide and pivot embodiment of a CCFD. In this embodiment, the axis of rotation 118 translates or slide along axis 120. This allows for a greater range of movement and flexibility for insertion into what may be crowded (USB) host receptacles.

FIG. 17 illustrates a holder type embodiment of a CCFD. In FIG. 17 the member can be removed from the card for insertion purposes. A connector (not shown) between the member 114' and the body of the card allows any data stored in the member to be communicated back to components on the body, including Smart Card contacts/interface, the magnetic stripe, or any other of the electronic components previously described. Member 114' has a female semi-cylindrical groove 119 that slides onto a male semi cylindrical portion 117 of the body of the drive. When a user wishes to plug member 114' into the host, he will slide member 114 off of semi cylindrical retaining portion 117. The male and female connecting portions may alternatively be gender reversed and of different geometry. USB contacts 37'-40' are also shown.

FIG. 17 illustrates another holder type embodiment of a CCFD. This embodiment also includes a removable member 114' in an open "pocket" of the body. Tabs 104 can be manipulated to insert or remove member 114, which is otherwise securely held in place.

Figure 19:
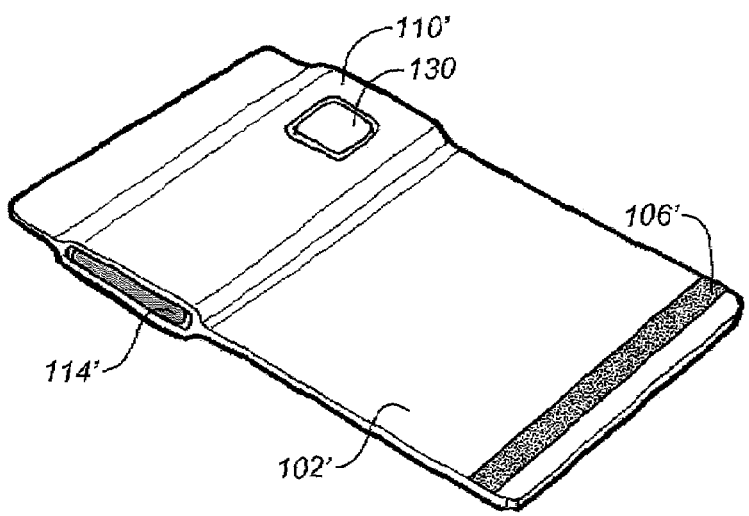
FIGS. 19-21 illustrate other holder type embodiments, some of which can also be implemented with push-push spring loaded implementations.
Figure 20:
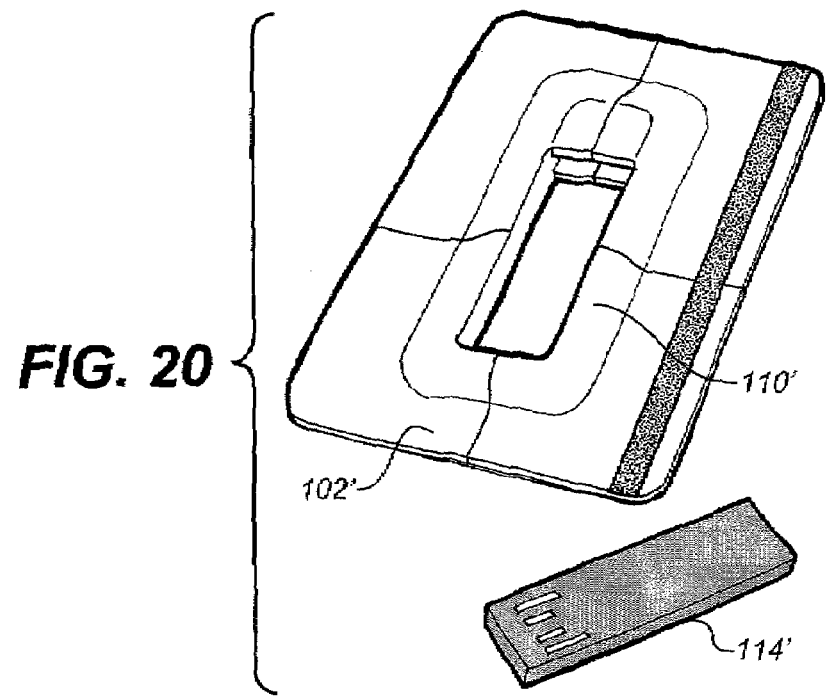
Figure 21:
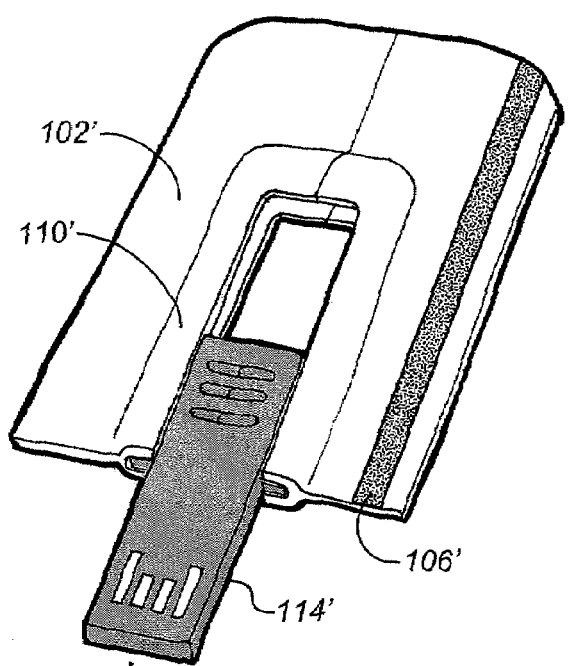

FIGS. 19-21 illustrate other holder type embodiments where the member may be removed. In the embodiment of FIG. 19, a push-push (spring loaded) type connector may be implemented such that one push of the distal end brings the member out and another push puts it away. Button 130 may alternatively be used to eject member 114'. Member 114' may also be completely removable in the embodiment of FIG. 19. In FIG. 20, the body of the drive is flexible and a user can bend each side to remove member 114'.

In FIG. 21 a detent stops the member from being removed past a certain point, although the detent may be overcome with sufficient pressure. Member 114' of FIG. 21 may be spring loaded or manually pushed with the ribs of the member.

Figure 22:
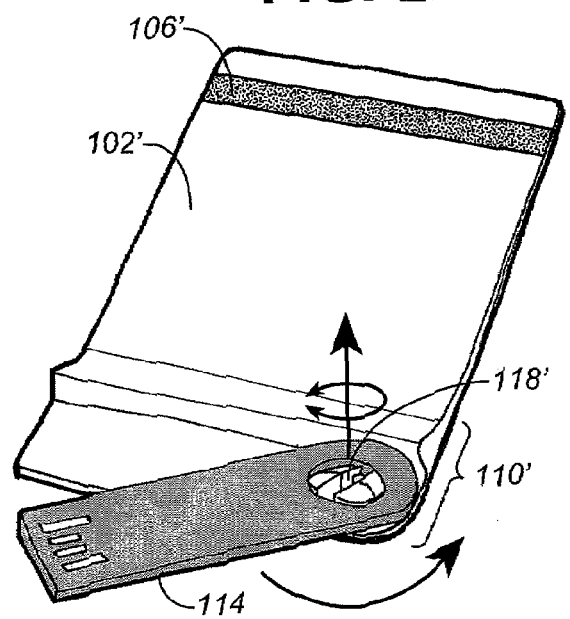
FIG. 22 illustrates another pivot embodiment of a CCFD.

FIG. 22 illustrates another pivot embodiment of a CCFD. In this embodiment there is no pocket or sleeve, and the member is at the shorter of the sides of the drive.

Figure 23:
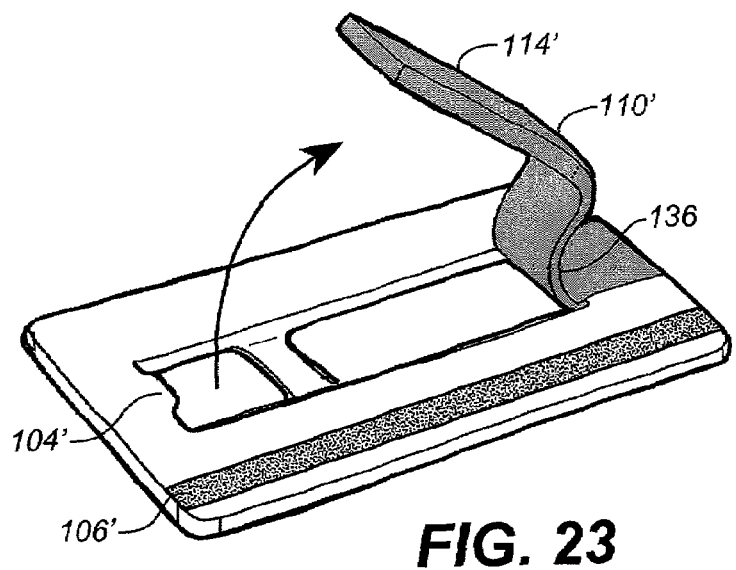
FIG. 23 illustrates a living hinge embodiment of a CCFD.

FIG. 23 illustrates a living hinge embodiment of a CCFD. In this embodiment, the flexible portion 136, that ties member 114' to the body of the drive, which may also be referred to as a living hinge, allows the member to be either flat within the body for insertion in a wallet, or extended away from the body for insertion into a USB port. The flexible living hinge 136 may be bent so that the member 114' may be removed from under tab 104' and then the distal end of member 114' can be extended away from the body and inserted into the host connector. The body and member may be made of one material or a combination of different materials with different moduli of elasticity.

Figure 24:
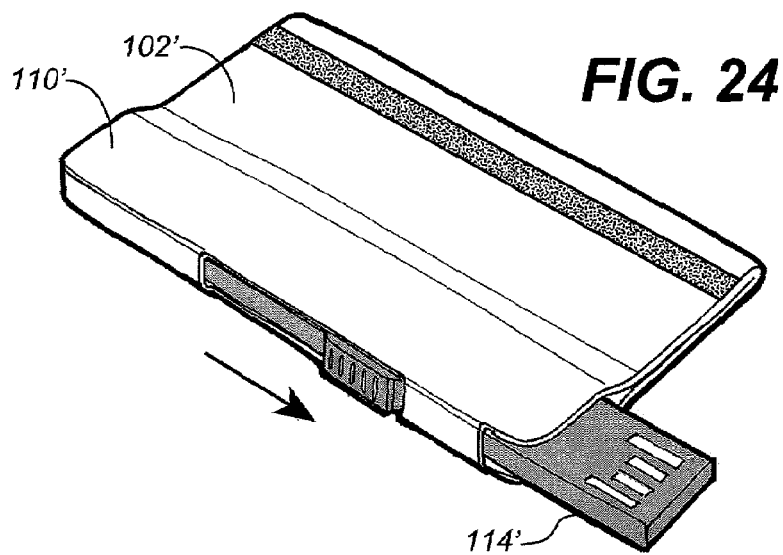
FIG. 24 illustrates a sliding embodiment of a CCFD.

FIG. 24 illustrates a sliding embodiment of a CCFD. In this embodiment, the member can be pushed in and out of the body. This may be manual or spring loaded.

Figure 25:
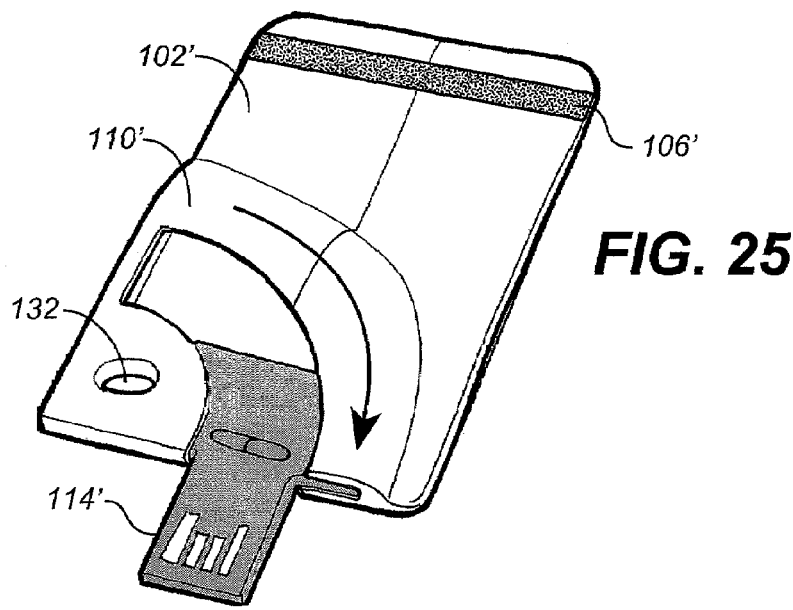
FIG. 25 illustrates a slide and turn embodiment of a CCFD.

FIG. 25 illustrates a slide and turn embodiment of a CCFD. In this embodiment the member has an arcuate portion and travels along an arc during extension and retraction. A hole 132 for a key ring may also be included.

Figure 26:
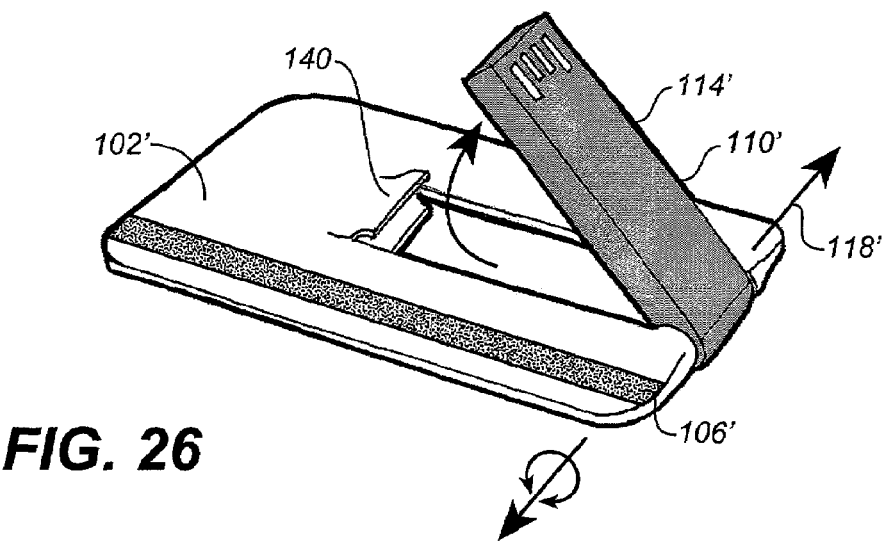
FIG. 26 illustrates a hinged embodiment of a CCFD.

FIG. 26 illustrates a hinged embodiment of a CCFD. In this case, the hinge is at an end of the card, and the member can be nearly as long as the card itself. It can also, of course, be any length less than the length of the card. A catch 140 is also included to keep the member substantially parallel to the card for storage and transport.

Figure 27:
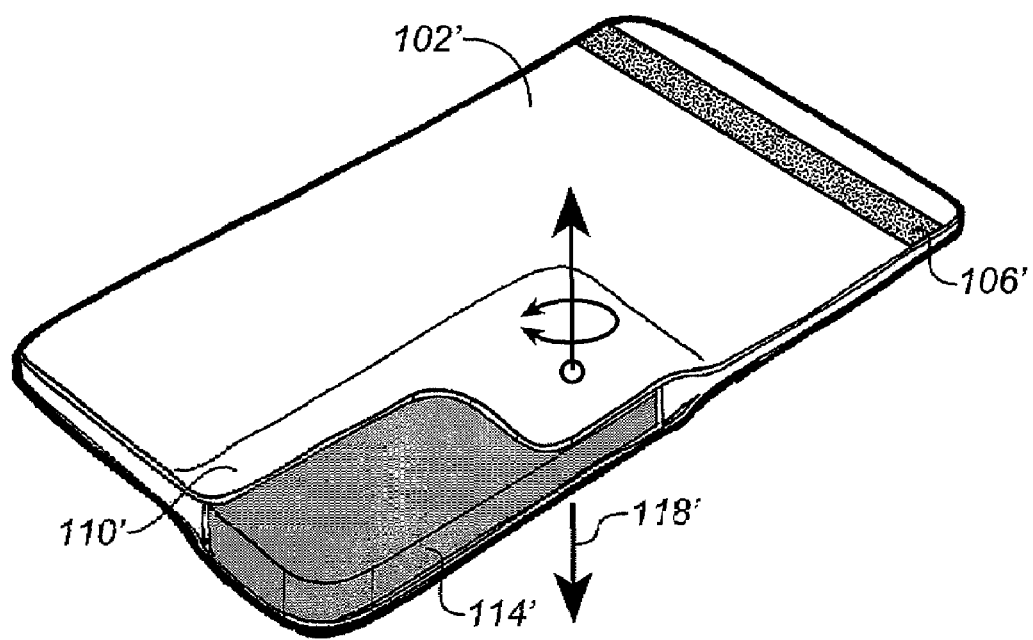
FIG. 27 illustrates another pivot embodiment of a CCFD.

FIG. 27 illustrates another pivot embodiment of a CCFD. In this case the pivot is centrally located on the long side of the card and the member can rotate out. Alternatively, the member can have a short cable/tether and be removed from its pocket while still electronically connected to other components on the body of the card.

Figure 28:
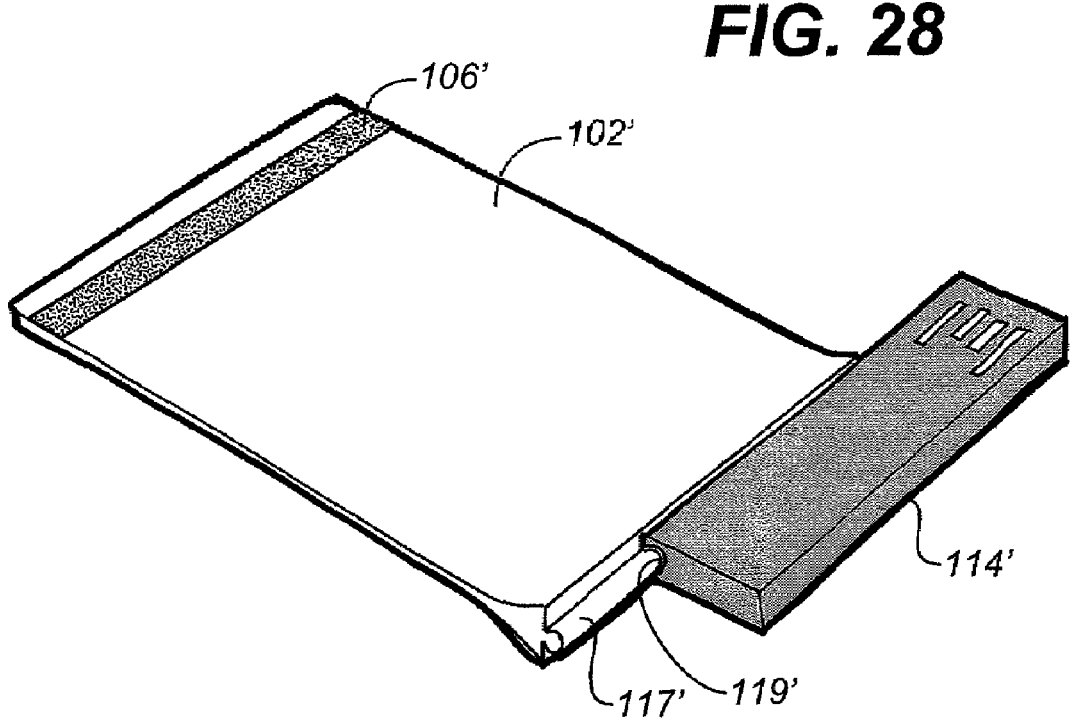
FIG. 28 illustrates a sliding embodiment of a CCFD.

FIG. 28 illustrates an embodiment of a CCFD similar to that of FIGS. 13A-B, but with the removable member 114' on the short side of the drive. The member 114' slides on a cylindrical rod of the body of the card.

Figure 29A:
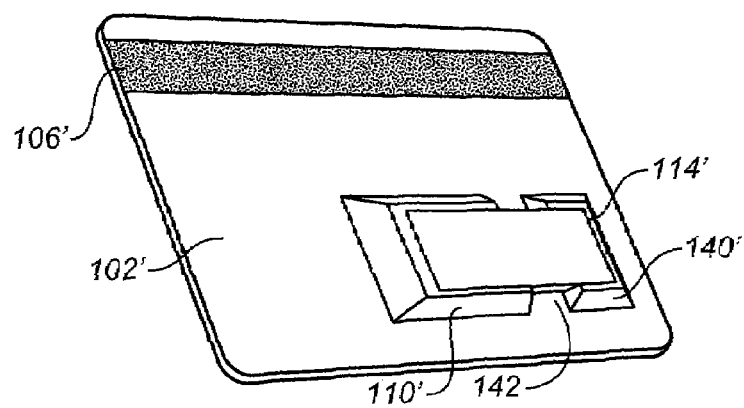
FIGS. 29A-D are different views of a bendable embodiment of a CCFD in a bent and unbent state.

FIGS. 29A-27B illustrate embodiments with a portion of the body of the drive made of a flexible material (e.g. a polymer, rubber, and/or composite) that allows sufficient bending of the credit card such that the USB plug at the end of member 114' can be distanced sufficiently from the body of the drive to be inserted into the host by bending of a portion of the drive.

Figure 29B:
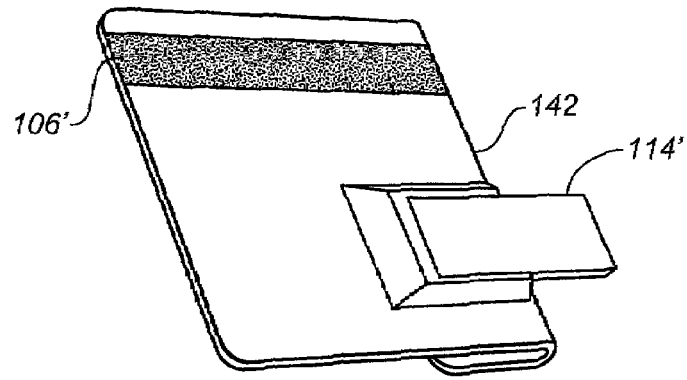
Figure 29C:
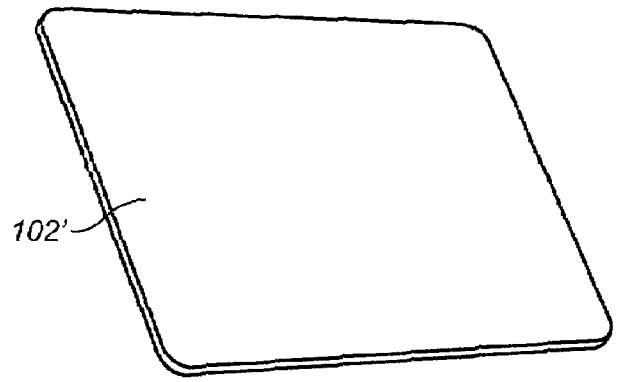
Figure 29D:
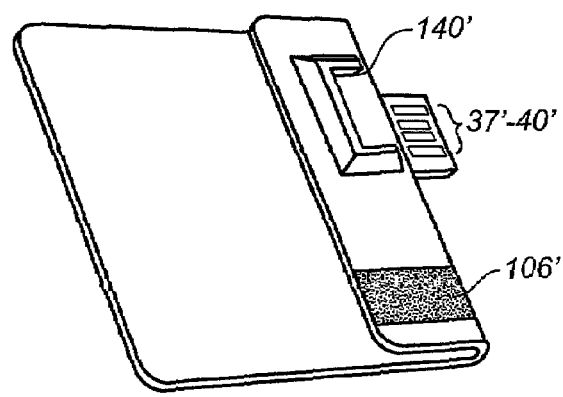

FIGS. 29A and 29B are a bottom view of such a drive. A type of latch or clip 140' retains the distal end of member 114' and thus maintains the body and overall drive in a flat or unfolded position, as seen in FIG. 29A. In FIG. 29B, a portion of the body of the drive is bent at an area 142 between latch 140' where the proximal end of the member 114' is attached to the thicker area 110' of the body of the drive. FIG. 29D is a top view with the drive folded/bent to expose contacts 37'-40'.

Figure 30A:
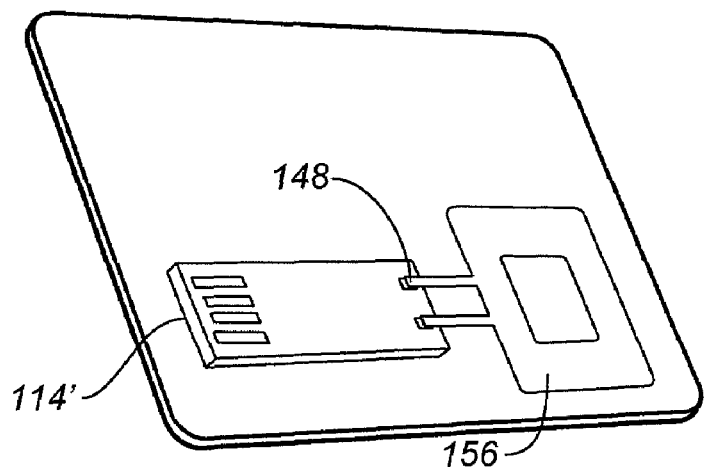
FIGS. 30A-B are different views of another bendable embodiment of a CCFD in a bent and unbent state.
Figure 30B:
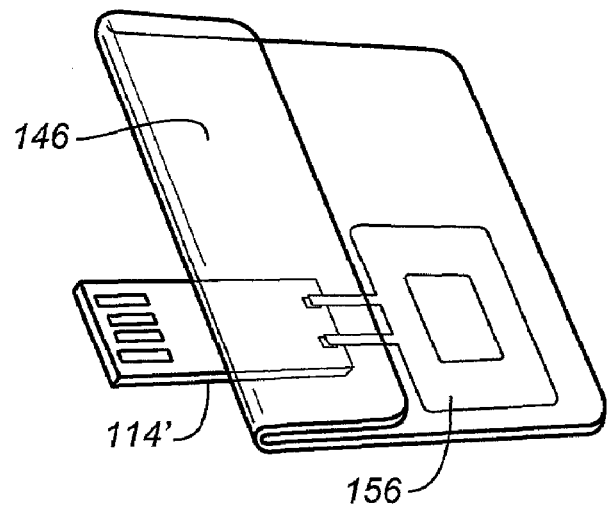

FIGS. 30A and 30B illustrate the same embodiment of FIGS. 29A-D with the addition of NFC antenna 156. FIG. 30A is a top view looking through the drive. Antenna 156 is connected to member 114' by solder or conductive glue attach. FIG. 30B is also a top view looking through the drive, but in FIG. 30B, the drive is folded or bent to make insertion of the USB connector portion of member 114'.

Figure 31A:
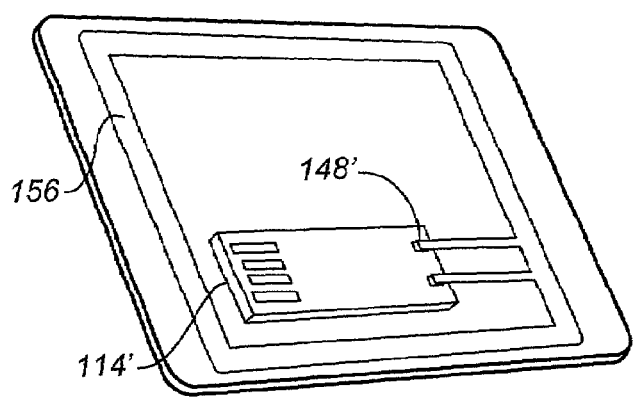
FIGS. 31A-B are different views of yet another bendable embodiment of a CCFD in a bent and unbent state.
Figure 31B:
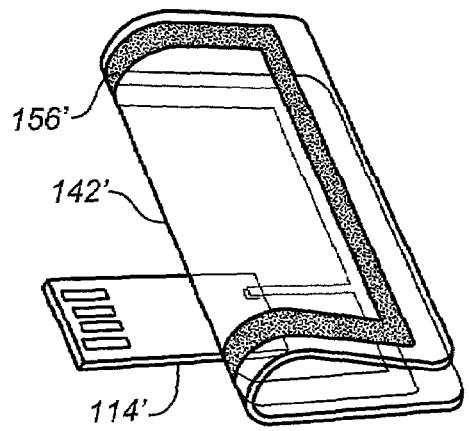

FIGS. 31A and 31B illustrate an embodiment identical to that of FIGS. 30A-B but with a larger antenna 156' that encircles member 114'. The drive can be seen bent an area 142' such that it is nearly folded entirely back upon itself.

Figure 32:
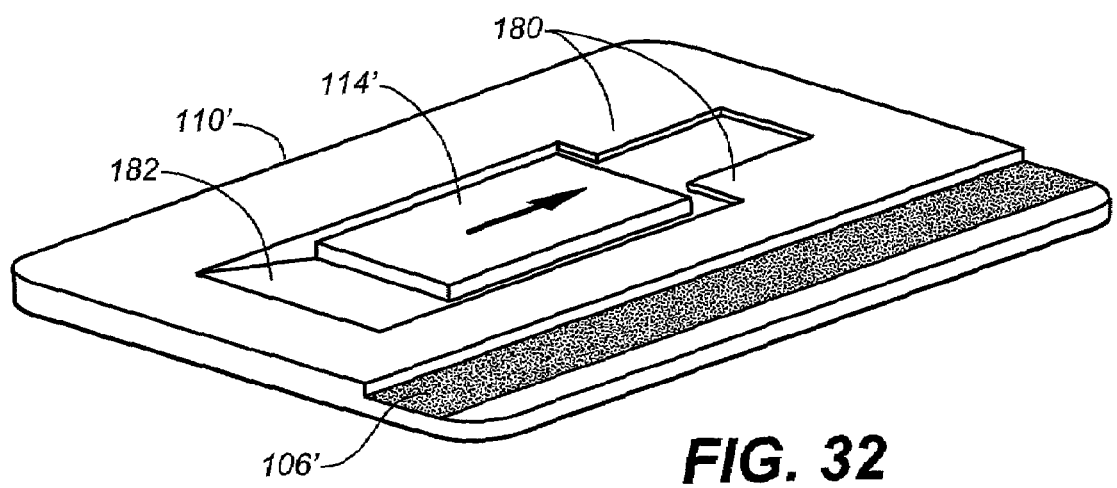
FIG. 32 is a perspective view of a holder type embodiment of a CCFD.

FIG. 32 illustrates an embodiment where member 114' slides within recess 182 of thicker portion 110 and is held in place under flaps 180. Member 114' and recess 182 may incorporate detents or a latching mechanism that aids in keeping member 114' in place. Member 114' may optionally slide away from the body on rails (not shown) and may in some cases be tethered to the body with a metal wire or wires. The metal wires may transfer data between the components in the member and in the body.

Note that in embodiments depicted with a varying thickness, the thickness may be uniform rather than varied, as mentioned previously. Additionally, the MI 106 need not necessarily be present in the various embodiments, although it is frequently shown for illustrative purposes. Additionally, although a type "A" USB connector has been depicted and described in many of the embodiments, a type "B," mini USB or other type USB connector may be utilized. Interfaces and connectors other than a USB type may also be used, as mentioned previously.

Although the various aspects of the present invention have been described with respect to exemplary embodiments thereof, it will be understood that the present invention is entitled to protection within the full scope of the appended claims.

It is claimed:

1. A flash memory drive comprising:
    a re-programmable non-volatile flash memory; and
    a body having a perimeter and two principal faces, the faces having a length and a width of a credit card such that there is a long side and a short side of the body,
    a member extendable some distance away from the body of the drive, the member comprising a USB connector on a distal portion of the member,
    the member rotating about an axis of rotation at a proximal end of the member, the axis of rotation operable to change location within the perimeter of the body.

2. The flash memory drive of claim 1, wherein the axis of rotation can be moved by a user in order to change to the position of the member for insertion of the member into a host device.

3. The flash memory drive of claim 1, wherein the member is able to extend away from two or more substantially perpendicular sides of the perimeter in a direction other than perpendicular to both of the two or more substantially perpendicular sides.

4. The flash memory drive of claim 1, wherein the perimeter further comprises one or more corners, the member operable to change angle about the axis and extend away from the one or more corners.

5. A portable credit card system comprising:
    a first element comprising a credit card interface for conducting credit card transactions; and
    a second element comprising:
        a USB flash memory drive comprising a mass storage flash memory, a memory controller, and a USB connector coupled to the memory controller,
        the second element detachable from the first element in order to be connected to a USB port of a host computing device,
        the second element attachable to the first element in order to be stored in a wallet, such that when the first and second element are attached, the credit card system has a length and width of a credit card.

6. The credit card system of claim 5, the first element further comprising a first mating connection to connect to the second element.

7. The credit card system of claim 6, the second element further comprising a second mating connection to connect to the first element.

8. The credit card system of claim 7, wherein the first and second mating connection comprise a male and female groove system.

9. The credit card system of claim 8, wherein the second element slides in relation to the first element.

10. The credit card system of claim 9, wherein the second element slides in and out of the first element.

11. The credit card system of claim 7, wherein the second element snaps into and out of the first element.

12. The credit card system of claim 11, wherein the first mating connection comprises a pliable material that is bent in order to insert or extract the second element.

13. The credit card system of claim 5, wherein the second element comprises a pocket that holds the first element.

14. A flash memory drive comprising:
    a re-programmable non-volatile flash memory;
    a body having a length and a width of a credit card; and
    a rigid member comprising a USB connector on a distal portion of the member,
    a portion of the body having a thickness acceptable for insertion into a standard credit card reader,
    the body configured to bend back upon itself thereby sufficiently exposing the USB connector of the member so that it may be inserted into a USB receptacle.

15. The drive of claim 14, wherein the drive further comprises a near field communications antenna on the body of the drive.

16. The drive of claim 15, wherein the drive further comprises near field communications control circuitry located at the member and coupled to the near field communications antenna on the body.

17. The drive of claim 15, wherein the near field communications antenna is flexible and bends with the body of the card when the body is bent back upon itself.

18. The drive of claim 14, wherein the drive further comprises a clip, the clip latching the body in an unbent position.

* * * * *